United States Patent
Kishikawa et al.

(10) Patent No.: US 10,462,226 B2
(45) Date of Patent: *Oct. 29, 2019

(54) METHOD FOR DETECTING FRAUDULENT FRAME SENT OVER AN IN-VEHICLE NETWORK SYSTEM

(71) Applicant: PANASONIC INTELLECTUAL PROPERTY CORPORATION OF AMERICA, Torrance, CA (US)

(72) Inventors: Takeshi Kishikawa, Osaka (JP); Hideki Matsushima, Osaka (JP); Tomoyuki Haga, Nara (JP); Manabu Maeda, Osaka (JP); Yuji Unagami, Osaka (JP); Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,451

(22) Filed: Oct. 25, 2018

(65) Prior Publication Data

US 2019/0068715 A1 Feb. 28, 2019

Related U.S. Application Data

(63) Continuation of application No. 15/076,650, filed on Mar. 22, 2016, now Pat. No. 10,158,717, which is a
(Continued)

(30) Foreign Application Priority Data

Feb. 20, 2015 (JP) ................................ 2015-032206

(51) Int. Cl.
*H04L 29/06* (2006.01)
*H04L 9/32* (2006.01)
(Continued)

(52) U.S. Cl.
CPC ............ *H04L 67/12* (2013.01); *B60R 16/023* (2013.01); *H04L 9/3242* (2013.01);
(Continued)

(58) Field of Classification Search
CPC ..... H04L 67/12; H04L 9/3297; H04L 9/3242; H04L 63/20; H04L 63/08; H04L 63/10; H04L 63/12; H04L 2209/84; B60R 16/023
(Continued)

(56) References Cited

U.S. PATENT DOCUMENTS 9,648,107 B1 * 5/2017 Penilla .................... H04L 67/12
10,158,717 B2 * 12/2018 Kishikawa ............ H04L 9/3242
(Continued)

FOREIGN PATENT DOCUMENTS

EP 2950482 12/2015
JP 2003-324459 A 11/2003
(Continued)

OTHER PUBLICATIONS

International Search Report of PCT application No. PCT/JP2015/002161 dated Jul. 7, 2015.
(Continued)

*Primary Examiner* — Aravind K Moorthy
(74) *Attorney, Agent, or Firm* — Greenblum & Bernstein, P.L.C.

(57) ABSTRACT

A fraud detection method for use in an in-vehicle network system including a plurality of electronic control units that communicate with one another via an in-vehicle network is provided. The method includes receiving at least one data frame sent to the in-vehicle network, verifying a specific identifier in the received data frame only when the received data frame is event-driven data and a state of a vehicle having the in-vehicle network system mounted therein is a
(Continued)

predetermined state, detecting the received data frame as an authenticated data frame when the verifying is successful, and detecting the received data frame as a fraudulent data frame when the verifying fails. The predetermined state of the vehicle is the vehicle traveling.

17 Claims, 28 Drawing Sheets

Related U.S. Application Data continuation of application No. PCT/JP2015/002161, filed on Apr. 21, 2015.

(60) Provisional application No. 61/990,360, filed on May 8, 2014.

(51) Int. Cl.
*G06F 7/04* (2006.01)
*G06F 17/00* (2019.01)
*H04L 29/08* (2006.01)
*B60R 16/023* (2006.01)

(52) U.S. Cl.
CPC ............ *H04L 9/3297* (2013.01); *H04L 63/08* (2013.01); *H04L 63/10* (2013.01); *H04L 63/12* (2013.01); *H04L 63/20* (2013.01); *H04L 2209/84* (2013.01)

(58) Field of Classification Search
USPC .......................... 726/1, 4, 13; 713/161, 168
See application file for complete search history.

(56) References Cited

U.S. PATENT DOCUMENTS

| | | | |
|---|---|---|---|
| 2004/0259545 A1* | 12/2004 | Morita | G08G 1/005 455/435.1 |
| 2008/0201772 A1 | 8/2008 | Mondaeev et al. | |
| 2010/0057292 A1 | 3/2010 | Ishikawa et al. | |
| 2011/0060496 A1* | 3/2011 | Nielsen | G06Q 10/0631 701/31.4 |
| 2013/0339721 A1 | 12/2013 | Yasuda | |
| 2014/0310530 A1 | 10/2014 | Oguma et al. | |
| 2014/0328352 A1 | 11/2014 | Mabuchi et al. | |
| 2015/0089236 A1 | 3/2015 | Han et al. | |
| 2015/0163210 A1* | 6/2015 | Meyers | H04W 4/70 726/4 |
| 2015/0244743 A1 | 8/2015 | Jagad et al. | |

FOREIGN PATENT DOCUMENTS

| | | |
|---|---|---|
| JP | 2012-178035 A | 9/2012 |
| WO | 2013/065689 A1 | 5/2013 |
| WO | 2013/094072 A1 | 6/2013 |

OTHER PUBLICATIONS

Michael Muter, et al., "A Structured Approach to Anomaly Detection for In-Vehicle Networks", IAS, 2010, pp. 92-98.
CAN Specification 2.0, 1991, [online], CAN in Automation(CiA), [searched on Nov. 14, 2014], Internet<URL: http://www.can-cia.org/fileadmin/cia/specifications/CAN20A.pdf.
Satoshi Otsuka et al., "Intrusion Detection for In-vehicle Networks without Modifying Legacy ECUs", IPSJ SIG Technical Report, vol. 2013-SLDM-160 No. 6/vol. 2013-EMB-28 No. 6, pp. 1-5, Mar. 6, 2013 (Partial Translation).
D.K. Nilsson et al., "Efficient In-Vehicle Delayed Data Authentication Based on Compound Message Authentication Codes" Vehicular Technology Conference, 2008, pp. 1-5.
H. Krawczyk et al., "HMAC: Keyed-Hashing for Message Authentication" Network Working Group, RFC2104, Feb. 1997.
English Translation of Chinese Search Report from the State Intellectual Property Office (SIPO) of the People's Republic of China dated Feb. 2, 2019 for the related Chinese Patent Application No. 201580001979.7.

* cited by examiner

MOST SIGNIFICANT BIT

FIG. 5

| ID | TRANSMISSION PERIOD |
|---|---|
| 0x100 | 50 |
| 0x200 | 100 |
| 0x300 | 70 |
| ... | ... |

FIG. 6

| ID | TRANSMISSION PERIOD | MARGIN |
|---|---|---|
| 0x100 | 50 | 1 |
| 0x200 | 100 | 1 |
| 0x300 | 70 | 1 |
| ... | ... | ... |

FIG. 7

| ID | PREVIOUS RECEIPT TIME |
|---|---|
| 0x100 | 200 |
| 0x200 | 220 |
| 0x300 | 230 |
| ... | ... |

FIG. 14

| ID | TRANSMISSION PERIOD | TRANSMISSION EVENT COUNTER |
|---|---|---|
| 0x100 | 50 | 15 |
| 0x200 | 100 | 0 |
| 0x300 | 70 | 5 |
| ... | ... | ... |

FIG. 15

| ID | PREVIOUS RECEIPT TIME | RECEPTION EVENT COUNTER |
|---|---|---|
| 0x100 | 200 | 15 |
| 0x200 | 220 | 0 |
| 0x300 | 230 | 5 |
| ... | ... | ... |

FIG. 21

| ID | TRANSMISSION PERIOD | EVENT-DRIVEN DATA FRAME FORMAT |
|---|---|---|
| 0x100 | 50 | LEAST SIGNIFICANT 16-BIT MAC |
| 0x200 | 100 | NO EVENT-DRIVEN DATA FRAME |
| 0x300 | 70 | LEAST SIGNIFICANT 16-BIT MAC |
| ... | ... | ... |

FIG. 22

| ID | TRANSMISSION PERIOD | MARGIN | EVENT-DRIVEN DATA FRAME FORMAT |
|---|---|---|---|
| 0x100 | 50 | 1 | LEAST SIGNIFICANT 16-BIT MAC |
| 0x200 | 100 | 1 | NO EVENT-DRIVEN DATA FRAME |
| 0x300 | 70 | 1 | LEAST SIGNIFICANT 16-BIT MAC |
| ... | ... | ... | ... |

FIG. 27

| ID | TRANSMISSION PERIOD | EVENT-DRIVEN DATA FRAME FORMAT | MAC PROVIDING CONDITION |
|---|---|---|---|
| 0x100 | 50 | PROVIDE MAC IN LEAST SIGNIFICANT 16 BITS | TRAVELLING |
| 0x200 | 100 | NO EVENT-DRIVEN DATA FRAME | NONE |
| 0x300 | 70 | PROVIDE MAC IN LEAST SIGNIFICANT 16 BITS | TRAVELLING, PARKING |
| ... | ... | ... | ... |

FIG. 28

| ID | TRANSMISSION PERIOD | MARGIN | EVENT-DRIVEN DATA FRAME FORMAT | MAC PROVIDED EVENT-DRIVEN DATA FRAME RECEPTION CONDITION |
|---|---|---|---|---|
| 0x100 | 50 | 1 | LEAST SIGNIFICANT 16-BIT MAC | TRAVELLING |
| 0x200 | 100 | 1 | NO EVENT-DRIVEN DATA FRAME | NONE |
| 0x300 | 70 | 1 | LEAST SIGNIFICANT 16-BIT MAC | TRAVELLING, PARKING |
| ... | ... | ... | ... | ... |

METHOD FOR DETECTING FRAUDULENT FRAME SENT OVER AN IN-VEHICLE NETWORK SYSTEM

CROSS REFERENCE TO RELATED APPLICATIONS

This is a continuation application of U.S. patent application Ser. No. 15/076,650, filed Mar. 22, 2016, which is a continuation of International Patent Application No. PCT/JP2015/002161, filed Apr. 21, 2015, which claims the benefit of U.S. Provisional Patent Application No. 61/990,360, filed May 8, 2014, and priority to Japanese Application No. 2015-032206, filed Feb. 20, 2015. The disclosures of these documents, including the specifications, drawings, and claims, are incorporated herein by reference in their entirety.

TECHNICAL FIELD

The present disclosure relates to a technology for detecting a fraudulent frame sent over an in-vehicle network in which electronic control units perform communication.

DESCRIPTION OF THE RELATED ART

In recent years, a plurality of devices called Electronic Control Units (ECUs) are disposed in a system of a motor vehicle. A network that connects the ECUs with one another is called an in-vehicle network. A plurality of standards are provided for in-vehicle networks. One of the mainstream standards is Controller Area Network (CAN) defined by ISO11898-1 (refer to "CAN Specification 2.0 Part A", [online], CAN in Automation (CiA), [searched on Nov. 14, 2014], the Internet (URL: http://www.can-cia.org/fileadmin/cia/specifications/CAN20A.pdf)).

In CAN, the communication channel is formed from 2 buses. An ECU connected to the bus is referred to as a "node". Each of the nodes connected to the bus receives and sends a message called a frame. A sender node that sends a frame applies voltages on the 2 buses so as to generate a potential difference between the buses. Thus, the sender node sends a value of "1" called "recessive" and a value of "0" called "dominant". If a plurality of sender nodes send recessive and dominant at exactly the same time, dominant has higher priority and is sent. If the format of a received frame is abnormal, the receiver node sends a frame called error frame. An error frame is formed from 6 consecutively sent dominant bits. By sending the error frame, the sender node or another receiver node is notified of the abnormity of a frame.

In addition, in CAN, identifiers indicating the destination address and the sender address are not present. The sender node attaches an ID called a message ID to each of frames and sends the frame (i.e., delivers a signal to the bus). Each of the receiver nodes receives only a predetermined ID (i.e., reads the signal from the bus). Furthermore, CAN employs the CSMA/CA (Carrier Sense Multiple Access/Collision Avoidance) technique. When a plurality of nodes simultaneously send frames, arbitration using the message IDs is performed, and a frame having a smaller message ID is sent first.

When, in an in-vehicle network, a fraudulent node is connected to the bus and if the fraudulent node unauthorizedly sends a data frame, the receiver node cannot detect that a fraudulent data frame is sent, since the identifier of the sender is not present in CAN.

Accordingly, by using the characteristics that the ECU periodically sends a data frame, a technology for detecting that transmission of a data frame that is not sent at a period other than the normal period is a fraudulent data frame has been developed (refer to Satoshi OTSUKA, Tasuku ISHIOKA, "Intrusion Detection for In-Vehicle Networks without Modifying Legacy ECUs", IPSJ SIG Technical Report, Special Interest Group on Embedded Systems, 2013-EMB-28 (6), pp. 1-5, hereinafter referred to as "NPL 1"). In addition, to indicate that a data frame has been sent from an authorized ECU, a fraud detection method using Message Authentication Code (MAC) has been developed (refer to D. K. Nilsson, U. E. Larson, E. Jonsson, "Efficient In-Vehicle Delayed Data Authentication Based on Compound Message Authentication Codes", Vehicular Technology Conference, 2008-Fall, pp. 1-5).

SUMMARY

However, according to the technology described in NPL 1, when an ECU periodically sends a data frame and if the ECU non-periodically sends a data frame triggered by an event (hereinafter, the non-periodically sent data frame is referred to as an "event-driven data frame"), even an authorized event-driven data frame may be incorrectly detected to be an unauthorized data frame. In addition, according to a technique for attaching MAC to all the data frames to be sent, the processing load required for attaching and verifying the MAC significantly increases.

One non-limiting and exemplary embodiment provides an electronic control unit (ECU) capable of efficiently and appropriately detecting that a fraudulent message is sent over a bus in an in-vehicle network system that performs communication in accordance with, for example, the CAN protocol. In addition, the present disclosure provides a fraud detection method for efficiently and properly detecting a fraudulent message and an in-vehicle network system including the ECU.

In one general aspect, the techniques disclosed here feature a fraud detection method for use in an in-vehicle network system using Controller Area Network (CAN) protocol. The method includes receiving at least one data frame sent to a bus, verifying a specific identifier in the received data frame only if the received data frame does not follow a predetermined rule regarding a transmission period and a state of a vehicle having the in-vehicle network system mounted therein is a predetermined state, detecting the received data frame as an authenticated data frame if the verifying is successful, and detecting the received data frame as a fraudulent data frame if the verifying fails.

According to the present disclosure, if a fraudulent node is connected to a bus in an in-vehicle network system and a fraudulent data frame is sent, the fraudulent data frame can be efficiently and properly detected.

It should be noted that general or specific embodiments may be implemented as a system, an apparatus, an integrated circuit, a computer program, a storage medium, such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates an example of a data frame generation rule according to the first embodiment;

FIG. 6 illustrates an example of period rule information according to the first embodiment;

FIG. 7 illustrates an example of a list of the pieces of information each indicating the previous receipt time of a data frame;

FIG. 14 illustrates an example of a data frame generation rule and an example of a transmission event counter according to the second embodiment;

FIG. 15 illustrates an example of a list of the previous receipt times of a data frame with reception event counters according to the second embodiment;

FIG. 21 illustrates an example of a data frame generation rule according to the third embodiment;

FIG. 22 illustrates an example of period rule information according to the third embodiment;

FIG. 27 illustrates an example of a data frame generation rule according to the fourth embodiment;

FIG. 28 illustrates an example of period rule information according to the fourth embodiment;

DETAILED DESCRIPTION

Figure 1:
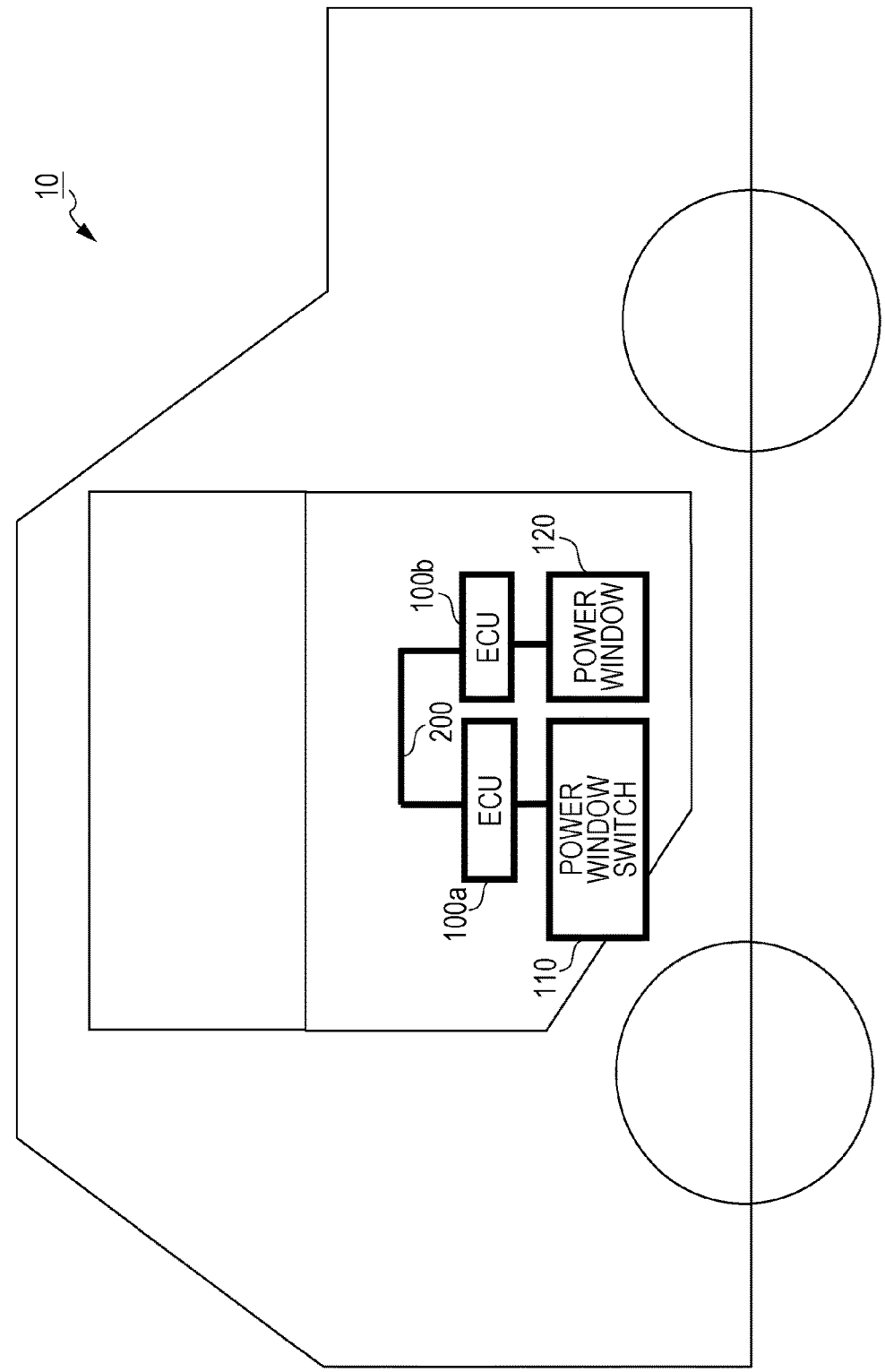
FIG. 1 illustrates the overall configuration of an in-vehicle network system according to a first embodiment.

According to an aspect of the present disclosure, a fraud detection method for use in an in-vehicle network system including a plurality of electronic control units that communicate with one another via a bus in accordance with the CAN (Controller Area Network) protocol is provided. The method includes receiving at least one data frame sent to the bus, verifying a specific identifier in the received data frame when the received data frame does not follow a predetermined rule regarding a transmission period and only if a state of a vehicle having the in-vehicle network system mounted therein is a predetermined state, detecting the received data frame as an authenticated data frame if the verification is successful, and detecting the received data frame as a fraudulent data frame if the verification fails. In this aspect, the predetermined rule regarding a transmission period is a rule defined in advance. For example, the predetermined rule regarding a transmission period is a condition of the transmission period of data frames having the same ID (a time difference between the previous transmission time and the current transmission time). In the fraud detection method, verification is performed to detect a fraudulent data frame. If the verification is successful for a data frame, the data frame is not detected as being fraudulent. Thus, when a data frame having a transmission period that does not satisfy the condition, that is, an event-driven data frame is received, the validity of the data frame cannot be determined on the basis of the predetermined rule. However, by verifying the specific identifier, the validity can be determined. As a result, misdetection, where a data frame that does not satisfy the predetermined rule is detected to be a fraudulent data frame, can be prevented, and a fraudulent data frame (a fraudulent message) can be properly detected. In addition, since a fraudulent message can be detected by verifying the specific identifier in the data frame that does not follow the predetermined rule, all the data frames need not include a specific identifier to be verified. Thus, efficient fraud detection can be provided. Note that efficient fraud detection also reduces power consumption of the in-vehicle network system.

In addition, the specific identifier may be a message authentication code that is set in a data field of the data frame at a predetermined position and that reflects the information in the data frame. In the verification step, verification may be performed by a predetermined processing procedure for determining whether the data set in the data frame that does not follow the predetermined rule at the predetermined position is the message authentication code on the basis of the information in the data frame. In this manner, a fraudulent ECU that does not know the predetermined rule regarding a transmission period and a predetermined verification procedure (e.g., an ECU other than the ECU that is a regular constituent element of the in-vehicle network system) has a difficulty sending a data frame including a specific identifier that makes the verification successful.

Alternatively, the specific identifier may be a predetermined value that is set in a data field of the data frame at a predetermined position. In the verification step, verification may be performed by determining whether a value of the data set in the data frame that does not follow the predetermined rule at the predetermined position is the same as the predetermined value. At that time, the specific identifier may be formed from a single bit or a plurality of bits. In this manner, the verification for fraud detection can be performed using a procedure with relatively low processing load, that is, comparison of the value with the predetermined value.

Alternatively, the specific identifier may be a counter value set in a data field of the data frame at a predetermined position. In the verification step, verification may be performed by determining whether a value of the data set in the data frame that does not follow the predetermined rule at the predetermined position is the same as the counter value that reflects the number of times at which a data frame that does not follow the predetermined rule is received in the reception step. In this manner, since the specific identifier is formed as a counter value that can vary in accordance with transmission and reception of data frames, a fraudulent ECU has difficulty sending a data frame including a specific identifier that makes the verification successful.

Alternatively, reception of a data frame is repeatedly performed in the reception step. The specific identifier may be a resultant value that is obtained through predetermined calculation and that is set in the data field of the data frame at a predetermined position. In the verification step, verification may be performed by determining whether a value of the data set in the data frame that does not follow the predetermined rule at the predetermined position is the same as a value obtained through the predetermined calculation on the basis of the specific identifier in a data frame including the specific identifier previously received in the reception step. For example, the predetermined calculation is a calculation (a function) performed by each of an authorized sender that sends a data frame that does not follow the predetermined rule regarding a transmission period (i.e., a non-periodic data frame) and an authorized receiver that receives the data frame. The output value (the resultant value) of the calculation is derived on the basis of the input value. If each of the sender and the receiver stores the resultant value of the predetermined calculation, which is the specific identifier when the previous non-periodical data frame was sent, the following verification can be made. That is, the sender sets, in the next non-periodic data frame, the output value (the resultant value) of the predetermined calculation (the function) using the previous specific identifier as the input and sends the data frame. The receiver verifies whether the received data frame contains the same value as the resultant value of the predetermined calculation using the previous specific identifier as the input. In this manner, a fraudulent ECU has difficulty sending a data frame including a specific identifier that makes the verification successful.

In addition, in the verification step, when a data frame that does not follow the predetermined rule is received in the reception step and only if a state of a vehicle having the in-vehicle network system mounted therein is a predetermined state, the verification may be performed on the specific identifier in the data frame. If a data frame that follows the predetermined rule is received in the reception step, the fraud detection method may detect the data frame to be an authorized data frame. If a data frame that does not follow the predetermined rule is received in the reception step and if the verification of the specific identifier in the data frame is successful in the verification step, the fraud detection method may detect the data frame to be an authorized data frame. If a data frame that does not follow the predetermined rule is received in the reception step and if the verification of the specific identifier in the data frame fails in the verification step, the fraud detection method may detect the data frame to be a fraudulent data frame. The processing to be performed after a fraudulent data frame is detected can be predetermined by the in-vehicle network system. Examples of the processing include discarding the data frame (e.g., no control of the vehicle is performed on the basis of the information in the data frame), recording the data frame as a log, and changing the operation mode of the vehicle. The predetermined state is, for example, a state in which the need for detecting a fraudulent data frame flowing in the bus is higher than in a state other than the predetermined state. Thus, the verification can be efficiently performed when the vehicle is in a predetermined state (e.g., when the need for fraud detection is high).

In addition, according to an aspect of the disclosure, a fraud detection method for sending a data frame to be subjected to fraud detection in an in-vehicle network system including a plurality of electronic control units that communicate with one another via a bus in accordance with the CAN (Controller Area Network) protocol is provided. The method includes the provision step of providing a specific identifier in the data frame when sending the data frame that does not follow a predetermined rule regarding a transmission period and the transmission step of sending the data frame that includes the specific identifier provided in the provision step and that does not follow the predetermined rule via the bus. In this manner, a sender ECU that regularly constitutes the in-vehicle network system sends a data frame that does not follow the predetermined rule and that includes the specific identifier so that the receiver can detect whether the data frame is a fraudulent data frame by verifying whether the data frame includes the specific identifier even when the received data frame does not follow the predetermined rule. Thus, appropriate fraud detection can be performed by the provision step and the transmission step.

In addition, in the provision step, the specific identifier may be provided by setting, in the data field of the data frame at a predetermined position, a message authentication code that reflects the information in the data frame. In this manner, a fraudulent ECU that does not know the predetermined rule regarding a transmission period and the message authentication code (e.g., an ECU other than the ECU that is a regular constituent element of the in-vehicle network system) has a difficulty sending a data frame including a specific identifier that makes the verification successful.

Alternatively, in the provision step, the specific identifier may be provided by setting, in the data field of the data frame at a predetermined position, a predetermined value as the specific identifier. In this manner, the ECU that receives the data frame can perform verification for fraud detection using a procedure with relatively low processing load, that is, comparison of the value with the predetermined value.

Alternatively, in the provision step, the specific identifier may be provided by setting, in the data field of the data frame at a predetermined position, a counter value that reflects the number of transmissions of the data frame that does not follow the predetermined rule in the transmission step as the specific identifier. In this manner, since the specific identifier is formed as a counter value that can vary in accordance with transmission and reception of a data frame, a fraudulent ECU has difficulty sending a data frame including a specific identifier that makes the verification successful.

Alternatively, the transmission of the data frame that does not follow the predetermined rule in the transmission step and provision of the specific identifier in the provision step may be repeatedly performed. In the provision step, the specific identifier may be provided by setting, in the data field of the data frame at a predetermined position, a resultant value obtained by performing a predetermined calculation on the basis of a specific identifier provided in the data frame that does not follow the predetermined rule and that was previously sent when the data frame is sent in the transmission step. Thus, a fraudulent ECU has difficulty sending a data frame including a specific identifier that makes the verification successful.

In addition, in the transmission step, a data frame that follows the predetermined rule may be further sent. In the provision step, when the state of the vehicle having the in-vehicle network system mounted therein is a predetermined state and only if the data frame that does not follow the predetermined rule is to be sent in the transmission step, the provision of a specific identifier in the data frame may be performed. The predetermined state is, for example, a state in which the need for detecting a fraudulent data frame flowing in the bus is higher than in a state other than the predetermined state. Thus, an ECU that receives a data frame can efficiently perform the verification only when the vehicle is in the predetermined state (e.g., when the need for fraud detection is high).

In addition, to solve the above-described issues, according to an aspect of the present disclosure, an in-vehicle network system including a plurality of electronic control units that communicate with one another via a bus in accordance with the CAN (Controller Area Network) protocol is provided. The system includes a first electronic control unit including a providing unit that provides a specific identifier in a data frame that does not follow a predetermined rule regarding a transmission period when sending the data frame and a transmitting unit that sends, via the bus, the data frame that includes the specific identifier provided by the providing unit and that does not follow the predetermined rule, and a second electronic control unit including a receiving unit that receives a data frame sent over the bus and a verifying unit that verifies a specific identifier in a data frame when the data frame that does not follow the predetermined rule is received by the receiving unit. In this manner, when a data frame having a transmission period that does not satisfy the condition, that is, an event-driven data frame is received, the validity of the data frame cannot be determined. However, by verifying the specific identifier, the validity can be determined. As a result, misdetection, where a data frame that does not satisfy the predetermined rule is detected to be a fraudulent data frame, can be prevented, and a fraudulent data frame (a fraudulent message) can be properly detected.

In addition, to solve the above-described issues, according to an aspect of the present disclosure, an electronic control unit (ECU) for communicating via a bus in accordance with the CAN (Controller Area Network) protocol is provided. The electronic control unit includes a providing unit that provides a specific identifier in a data frame that does not follow a predetermined rule regarding a transmission period when sending the data frame and a transmitting unit that sends, via the bus, the data frame that includes the specific identifier provided by the providing unit and that does not follow the predetermined rule. In this manner, when a data frame having a transmission period that does not satisfy the condition, that is, an event-driven data frame is sent, the data frame can be sent so as not to be misdetected as being fraudulent.

In addition, according to an aspect of the present disclosure, an electronic control unit (ECU) for communicating via a bus in accordance with the CAN (Controller Area Network) protocol is provided. The electronic control unit includes a receiving unit that receives a data frame sent over the bus and a verifying unit that verifies a specific identifier in a data frame that does not follow a predetermined rule regarding a transmission period when the data frame is received by the receiving unit. In this manner, when a data frame having a transmission period that does not satisfy the condition, that is, an event-driven data frame is received, the validity of the data frame cannot be determined. However, by verifying the specific identifier, the validity can be determined. As a result, misdetection, where a data frame that does not satisfy the predetermined rule is detected as being fraudulent, can be prevented, and a fraudulent data frame can be properly detected.

It should be noted that these general and specific aspects may be implemented as a system, a method, an integrated circuit, a computer program, or a computer-readable storage medium, such as a CD-ROM, or any combination of a system, a method, an integrated circuit, a computer program, and a computer-readable storage medium.

An in-vehicle network system and an ECU according to embodiments are described below with reference to the accompanying drawings. Each of the embodiments described below is a particular example of the present disclosure. Accordingly, a value, a shape, a material, a constituent element, the positions and the connection form of the constituent elements, steps (processes), and the sequence of steps used in the following embodiments are only examples and shall not be construed as limiting the scope of the present disclosure. In addition, among the constituent elements in the embodiments described below, the constituent element that does not appear in an independent claim is described as an optional constituent element. In addition, all the drawings are schematic illustrations and, thus, are not exactly precisely illustrated.

First Embodiment

An in-vehicle network system 10 according to an embodiment of the present disclosure that achieves a fraud detection method for appropriately detecting that a fraudulent data frame is sent between an ECU 100a and an ECU 100b that communicate data frames to each other under the condition that a non-periodical event-driven data frame can be sent in addition to a periodically sent data frame is described below with reference to the accompanying drawings.

1.1 Overall Configuration of In-Vehicle Network System

FIG. 1 illustrates the overall configuration of the in-vehicle network system 10 according to a first embodiment. The in-vehicle network system 10 is an example of an in-vehicle network system that performs communication in accordance with the CAN protocols. The in-vehicle network system 10 is a network communication system in a motor vehicle having a variety of devices, such as a control unit and a sensor, mounted therein. The in-vehicle network system 10 includes the ECUs 100a and 100b connected to a variety of devices and a bus 200 that connects the ECUs to each another. Note that the in-vehicle network system 10 further includes ECUs (not illustrated in FIG. 1) other than the ECUs 100a and 100b. However, for convenience of description, the following description is given with reference to only the ECUs 100a and 100b. The ECU is a device including, for example, digital circuits, such as a processor (a microprocessor) and a memory, analog circuits, and a communication circuit. Examples of the memory includes a ROM and a RAM, which can store a control program (a computer program) executed by the processor. For example, when the processor operates in accordance with the control program (the computer program), the ECU can provide a variety of functions. Note that the computer program is formed from a plurality of instruction codes that instruct the processor to operate so that a predetermined function is provided. Hereinafter, description is given under the assumption that a fraudulent ECU that sends a fraudulent data frame may be connected to the bus 200.

The ECU 100a is connected to a power window switch 110, which is an example of a device including at least one sensor. The ECU 100a periodically sends, to the bus 200, a data frame including information indicating the state of the power window switch 110. In addition, if the state of the power window switch 110 varies, the ECU 100a sends a data frame including the information indicating the state of the power window switch 110 (i.e., the information indicating a sensor value) to the bus 200. Accordingly, in addition to repeatedly sending the data frame at predetermined transmission periods, the ECU 100a sends a non-periodical event-driven data frame to the bus 200 if the time at which the state of the power window switch 110 varies does not exactly match the transmission period. Furthermore, the ECU 100a receives a data frame that is sent from the ECU 100b to the bus 200 and that flows in the bus 200. Thereafter, the ECU 100a verifies whether, for example, the data frame received by the ECU 100a has been correctly received.

The ECU 100b is connected to a power window 120. The ECU 100b receives a data frame that is sent from the ECU 100a to the bus 200 and that flows in the bus 200. Thereafter, the ECU 100b controls the power window 120 so that the power window 120 is open or closed in accordance with the state of the power window switch 110 included in the data frame. In addition, the ECU 100b periodically sends a data frame in accordance with the open/close control state of the power window 120 to the bus 200. In the in-vehicle network system 10, each of the ECUs sends and receives a frame in accordance with the CAN protocol. The ECUs have a function of determining whether the received data frame is a fraudulent data frame.

1.2 Data Frame Format

A data frame, which is one of the frames used in a network based on CAN protocol, is described below.

Figure 2:
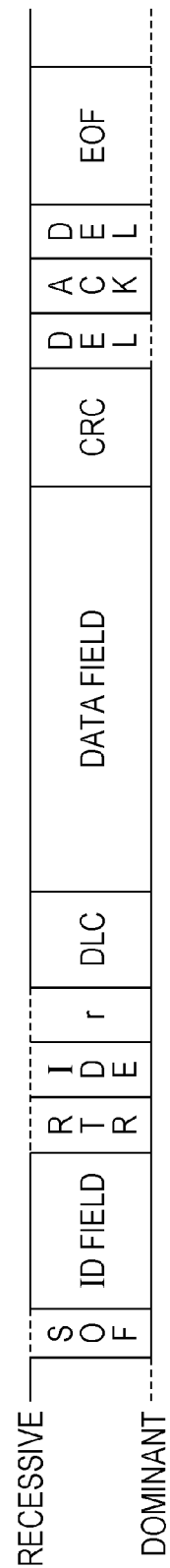
FIG. 2 illustrates the data frame format defined by the CAN protocol.

FIG. 2 illustrates the format of a data frame defined by the CAN protocol. The data frame having a standard ID format defined by the CAN protocol is illustrated in FIG. 2. The data frame includes an SOF (Start Of Frame) field, an ID field, an RTR (Remote Transmission Request) field, an IDE (Identifier Extension) field, a reservation bit "r", a DLC (Data Length Code) field, a data field, a CRC (Cyclic Redundancy Check) sequence field, a CRC delimiter field "DEL", an ACK (Acknowledgement) slot field, an ACK delimiter field "DEL", and an EOF (End Of Frame) field.

The SOF field is formed from one dominant bit. When the bus is idle, the state of the bus is recessive. By changing the state of the bus from recessive to dominant using SOF, the notice of start of frame transmission is given.

The ID field is a 11-bit field. The ID field includes an ID (a message ID) that is a value indicating the type of data. In order to perform communication arbitration using the ID field, the design is such that if a plurality of nodes simultaneously start transmission, a frame having a lower ID value has a higher priority.

RTR is a value for distinguishing a data frame from a remote frame. In data frames, the RTR field is formed from one dominant bit.

Each of IDE and "r" is formed from one dominant bit.

DLC is of 4 bits. DLC indicates the length of the data field. Note that IDE, "r", and DLC are collectively referred to as a "control field".

The data field indicates the data to be transmitted, where the maximum length of the data field is 64 bits. The length can be controlled to 8 to 64 bits (multiple of 8 bits). The specification of data to be transmitted is not defined by the CAN protocol and is defined by the in-vehicle network system 10. Accordingly, the specification of the data depends on, for example, the type of vehicle and the manufacturer (the maker).

The CRC sequence field is a 15-bit field. The CRC sequence is calculated using the transmitted values of SOF, the ID field, the control field, and the data field.

The CRC delimiter is formed from one recessive bit. The CRC delimiter is a delimiter symbol that indicates termination of the CRC sequence. Note that the CRC sequence field and the CRC delimiter field are collectively referred to as a "CRC field".

The ACK slot field is a 1-bit field. The sender node sets the ACK slot to recessive and transmits data. If a receiver node successfully receives the data up to the CRC sequence, the receiver node sets the ACK slot to dominant and sends the data. The dominant has a priority over the recessive. Accordingly, if the ACK slot is dominant after transmission, the sender node can be aware that any one of the receiver nodes has successfully received the data.

The ACK delimiter is formed from one recessive bit. The ACK delimiter is a delimiter symbol that indicates termination of ACK.

The EOF field is formed from 7 recessive bits. EOF indicates termination of the data frame.

1.3 Data Field Format

The data field of the data frame used in the in-vehicle network system 10 is described below.

Figure 3:
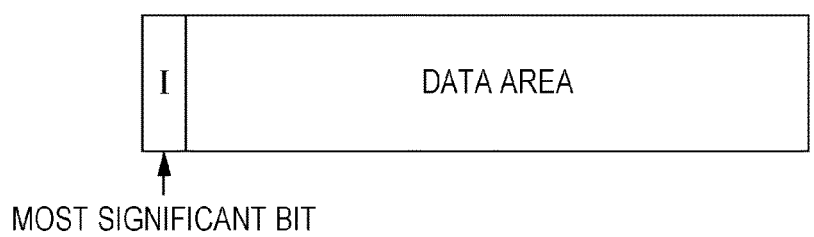
FIG. 3 illustrates an example of the data field format used in the in-vehicle network system according to the first embodiment.

FIG. 3 illustrates an example of the data field format used in the in-vehicle network system. As illustrated in FIG. 3, the most significant bit "I" of the data field (the first one bit) is an identification flag that identifies whether the data frame including the data field is an event-driven data frame (hereinafter, the flag is referred to as an "event-driven identification flag"). The event-driven identification flag I is set to 0 for a data frame that is periodically sent. In contrast, the event-driven identification flag I is set to 1 for an event-driven data frame. A data area that follows the event-driven identification flag I includes data indicating the sensor values acquired from, for example, a device by the ECU (e.g., a value indicating the state of the power window switch 110 in the data frame sent from the ECU 100a). In an example illustrated in FIG. 3, the most significant bit is used as the event-driven identification flag I. However, the event-driven identification flag I may be placed at any bit position (e.g., the least significant bit) in the data field.

1.4 Configuration of ECU

Figure 4:
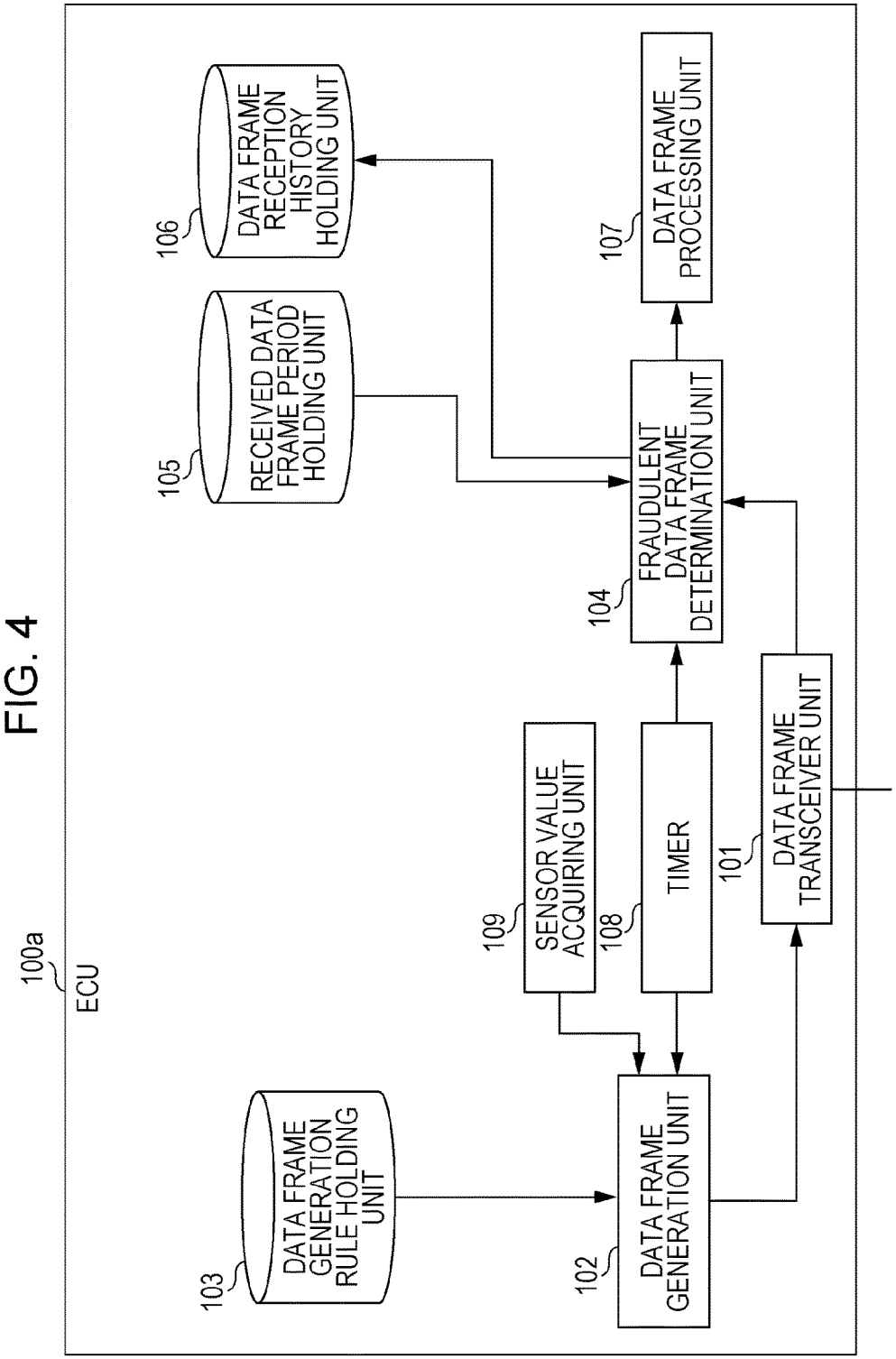
FIG. 4 illustrates the configuration of an ECU according to the first embodiment.

FIG. 4 is the configuration diagram of the ECU 100a. The ECU 100a includes a data frame transceiver unit 101, a data frame generation unit 102, a data frame generation rule holding unit 103, a fraudulent data frame determination unit 104, a received data frame period holding unit 105, a data frame reception history holding unit 106, a data frame processing unit 107, a timer 108, and a sensor value acquiring unit 109. These constituent elements are functional constituent elements. The functions of the constituent elements are realized by the communication circuit of the ECU 100*a* and one of, for example, the processor that executes the control program stored in the memory and a digital circuit. Note that the ECU 100*b* has substantially the same configuration as that of the ECU 100*a*. However, the information stored in each of the data frame generation rule holding unit 103, the received data frame period holding unit 105, and the data frame reception history holding unit 106 may differ on an ECU basis. In addition, the processing performed by the data frame processing unit 107 differs on an ECU basis.

The data frame transceiver unit 101 receives a data frame flowing in the bus 200 and interprets the data frame in accordance with the CAN protocol. If the ID (the message ID), which is the information in the ID field of the received data frame, is a message ID that is predetermined for the ECU 100*a* itself to receive, the data frame transceiver unit 101 sends the information in the data frame to the fraudulent data frame determination unit 104. In addition, the data frame transceiver unit 101 sends the data frame sent from the data frame generation unit 102 to the bus 200 in accordance with the CAN protocol.

The data frame generation unit 102 generates a data frame in accordance with data frame generation rules stored in the data frame generation rule holding unit 103 and sends the generated data frame to the data frame transceiver unit 101. The data frame generation unit 102 acquires the current time from the timer 108. In addition, the data frame generation unit 102 acquires, from the sensor value acquiring unit 109, the data regarding a device (the power window switch 110) connected to the ECU 100*a* (i.e., the sensor value). To periodically send a data frame from the ECU 100*a,* the data frame generation unit 102 determines the timing at which the data frame is generated using the current time and the transmission period stored in the data frame generation rule holding unit 103 and periodically generates the data frame. Note that after the data frame is generated by the data frame generation unit 102, the data frame is sent to the data frame transceiver unit 101. The data frame transceiver unit 101 sends the data frame. In addition, if a point in time at which the sensor value acquired from the sensor value acquiring unit 109 varies differs from the above-described periodical timing (e.g., a timing outside a margin indicating an allowable range of the periodical timing), the data frame generation unit 102 generates an event-driven data frame. That is, when sending a data frame at a timing that does not follow the data frame generation rule indicating the transmission period, the data frame generation unit 102 generates a data frame having a specific identifier called event-driven identification flag provided therein. That is, the data frame generation unit 102 functions as a providing unit. The sensor value acquiring unit 109 may operate using a technique in which the sensor value acquiring unit 109 acquires the sensor value from the sensor (the power window switch 110) when the sensor value varies or remains unchanged as needed or using a technique in which the sensor value acquiring unit 109 acquires the sensor value only when the sensor value varies. The data frame generation unit 102 periodically generates a data frame having the data field including the latest sensor value acquired from the sensor by the sensor value acquiring unit 109. In addition, the data frame generation unit 102 generates an event-driven data frame including the sensor value that has varied from the previous sensor value. Note that at the timing at which the data frame is periodically generated, the data frame including a sensor value that has not varied from the previous sensor value and, thus, is the same as the previous sensor value may be generated, or the data frame including a sensor value that has varied from the previous sensor value may be generated. In addition, an event-driven data frame that is generated at a timing that is not the periodical timing is a data frame including a sensor value that has varied from the previous sensor value. Accordingly, a data frame is periodically sent from the ECU 100*a* to the bus 200 by the data frame transceiver unit 101. In addition, the event-driven data frame is non-periodically sent. That is, in addition to the function of a receiving unit that receives a data frame transmitted over the bus 200, the data frame transceiver unit 101 has a function of sending an event-driven data frame, which includes a specific identifier and which does not follow the data frame generation rule indicating the transmission period, to another ECU via the bus 200. That is, the data frame transceiver unit 101 also functions as a transmitting unit.

The data frame generation rule holding unit 103 is formed from a storage medium, such as a memory. The data frame generation rule holding unit 103 stores, as the data frame generation rule, the transmission period used to periodically send a data frame for each of the message IDs sent from the ECU 100*a* itself. FIG. 5 illustrates an example of the data frame generation rule stored in the data frame generation rule holding unit 103. In this case, the ECU 100*a* sends a plurality of types of data frame (a type of data frame identified by the message ID), such as a data frame indicating the state of the power window switch 110. In the example in FIG. 5, the transmission period of a data frame that is periodically sent from the ECU 100*a* and that has a message ID of 0x100 is 50 ms. The transmission period of a data frame having a message ID of 0x200 is 100 ms, and the transmission period of a data frame having a message ID of 0x300 is 70 ms.

The fraudulent data frame determination unit 104 determines whether the received data frame is an authorized data frame (not a fraudulent data frame). That is, the fraudulent data frame determination unit 104 refers to period rule information (described in more detail below) in the received data frame period holding unit 105 for the data frame sent from the data frame transceiver unit 101 and verifies whether the data frame satisfies a transmission period condition predetermined for each of the message IDs. If the data frame satisfies a transmission period condition, the fraudulent data frame determination unit 104 determines that the data frame is a data frame sent from an authorized ECU (i.e., an authorized data frame). In addition, if the data frame does not satisfy the transmission period condition, the fraudulent data frame determination unit 104 verifies the event-driven identification flag used to identify whether the data frame is an event-driven data frame. If it is identified that the data frame is an event-driven data frame, the fraudulent data frame determination unit 104 determines that the data frame is a data frame sent from an authorized ECU (i.e., an authorized data frame). That is, if a data frame that does not match the period rule information (described in more detail below) corresponding to the data frame generation rule indicating the transmission period is received by the data frame transceiver unit 101, the fraudulent data frame determination unit 104 verifies the specific identifier called the event-driven identification flag in the data frame. That is, the fraudulent data frame determination unit 104 has a function of a verifying unit. When the received data frame does not satisfy the predetermined transmission period condition and is not identified as being an event-driven data frame by the event-driven identification flag (that is, if the verification of the specific identifier fails), the fraudulent data frame determination unit 104 determines that the received data frame is a fraudulent data frame. If it is determined that the received data frame is an authorized data frame, the fraudulent data frame determination unit 104 causes the data frame processing unit 107 to process the data frame. However, if it is determined that the received data frame is a fraudulent data frame, the fraudulent data frame determination unit 104 discards the data frame (i.e., inhibits the data frame processing unit 107 from processing the data frame). In addition, if the fraudulent data frame determination unit 104 receives a data frame that satisfies the transmission period condition, the fraudulent data frame determination unit 104 stores the receipt time in the data frame reception history holding unit 106 as the previous receipt time (described in more detail below).

The received data frame period holding unit 105 is formed from a storage medium, such as a memory. The received data frame period holding unit 105 stores the period rule information. The period rule information indicates a correspondence between a predetermined transmission period for each of the message IDs of the data frames received by the ECU 100a itself and a margin indicating an allowable range used for the data frame reception period to be determined to satisfy the transmission period condition (that is, to be the same as the valid transmission period). The transmission period in the period rule information stored in the received data frame period holding unit 105 of an ECU on a data frame receiver side corresponds to the transmission period of the data frame generation rule stored in the data frame generation rule holding unit 103 of an ECU on the data frame sender side. FIG. 6 illustrates an example of the period rule information stored in the received data frame period holding unit 105 of the ECU 100b that receives a data frame sent from the ECU 100a. In an example in FIG. 6, the transmission period of the data frame having a message ID of 0x100 is 50 ms. The transmission period of the data frame having a message ID of 0x200 is 100 ms, and the transmission period of the data frame having a message ID of 0x300 is 70 ms. In the example illustrated in FIG. 6, the margin is 1 ms for all the message IDs. Since the margin is 1 ms, the fraudulent data frame determination unit 104 of the ECU 100b determines that the transmission period condition is satisfied if the transmission period for the data frame having a message ID of 0x100 is in the range between 49 ms and 51 ms (inclusive).

The data frame reception history holding unit 106 is formed from a storage medium, such as a memory. The data frame reception history holding unit 106 holds a list of the message IDs of data frames periodically and normally received (i.e., received as an authorized data frame) by the ECU 100a itself with their previous receipt times, where the previous receipt time is the latest time of periodical reception of the data frame. FIG. 7 illustrates an example of a list of the message IDs of data frames periodically received as authorized data frames with their previous receipt times. In FIG. 7, an example of a list held by the data frame reception history holding unit 106 of the ECU 100b is illustrated. In this example, the latest time (the previous receipt time) at which a periodical data frame having a message ID of 0x100 is received is 200 ms. The previous receipt time at which a periodical data frame having a message ID of 0x200 is received is 220 ms, and the previous receipt time at which a periodical data frame having a message ID of 0x300 is received is 230 ms.

The data frame processing unit 107 performs a process on the data frame that is determined to be the authorized data frame by the fraudulent data frame determination unit 104. The process is predetermined in accordance with the data frame for each of the ECUs. For example, the ECU 100a that has sent a data frame indicating the state of the power window switch 110 receives, from the ECU 100b, a data frame corresponding to the open/close control state of the power window 120. Thereafter, the ECU 100a performs a process for determining whether the power window 120 has appropriately responded. If the power window 120 has not appropriately responded, the ECU 100a performs a process for outputting alarm sound or sending an abnormal message to another ECU.

The timer 108 is a clock mechanism. For example, the timer 108 is reset to 0 when the engine of the vehicle is started or the power is supplied from a battery to the timer 108 and sends, to the data frame generation unit 102 and the fraudulent data frame determination unit 104, a message indicating the elapsed time from that point. By using the timer 108, the data frame generation unit 102 can periodically send a data frame at predetermined transmission periods. Thus, the fraudulent data frame determination unit 104 can determine whether the reception period of the received data frame satisfies the predetermined transmission period condition.

The sensor value acquiring unit 109 acquires the sensor value indicating the state of the device (the power window switch 110) that is connected to the ECU 100a itself and periodically sends the acquired sensor value to the data frame generation unit 102. In addition, when the sensor value varies, the sensor value acquiring unit 109 sends the sensor value to the data frame generation unit 102.

1.5 Transmission and Reception of Data Frame

Transmission and reception of a data frame between the ECUs via the bus 200 is described below with reference to FIGS. 8 to 10.

Figure 8:
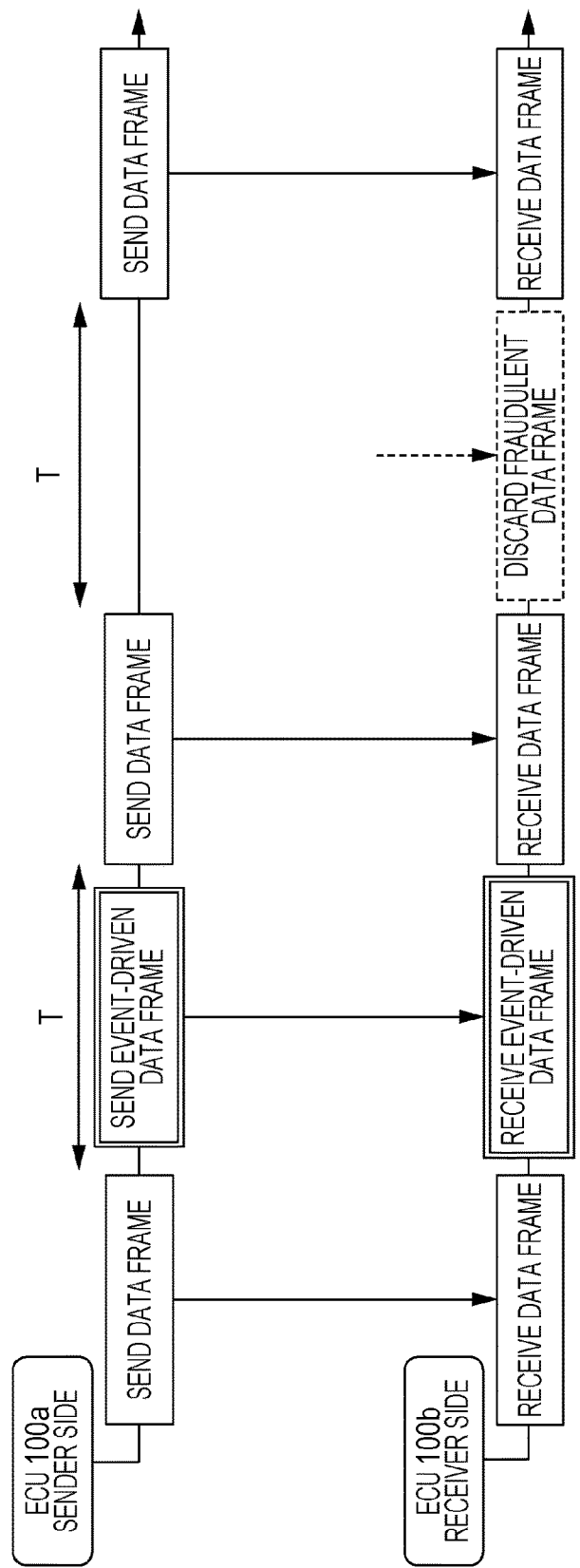
FIG. 8 illustrates the flow of transmitted and received data frames according to the first embodiment.

FIG. 8 illustrates the flow of the transmitted and received data frames when the ECU 100a is the sender of a data frame and the ECU 100b is the receiver of the data frame.

A period of time T illustrated in FIG. 8 represents the transmission period of a data frame that is periodically sent. The period of time T is the transmission period held by the data frame generation rule holding unit 103 of the ECU 100a serving as a sender. In addition, the period of time T is presumably the same as the transmission period in the period rule information held by the received data frame period holding unit 105 of the ECU 100b serving as a receiver. The ECU 100a periodically sends a data frame. In addition to the periodical transmission, if the timing of a change in the state of the power window switch 110 connected thereto is not the same as the periodical transmission timing, the ECU 100a sends an event-driven data frame at the timing when the state changes.

In the in-vehicle network system 10, if a fraudulent ECU connected to the bus 200 sends a fraudulent data frame, the fraudulent data frame can be distinguished from the authorized data frame sent from the ECU 100a. That is, the fraudulent data frame can be distinguished from an authorized data frame by the ECU 100b. To distinguish the fraudulent data frame from an authorized data frame, the period rule information regarding the data frames that are periodically sent (the condition regarding the transmission period) is used for the above-described periodically sent data frames. In addition, for event-driven data frames that do not satisfy the transmission period condition, the specific identifier called the event-driven identification flag in the data field is used.

Figure 9:
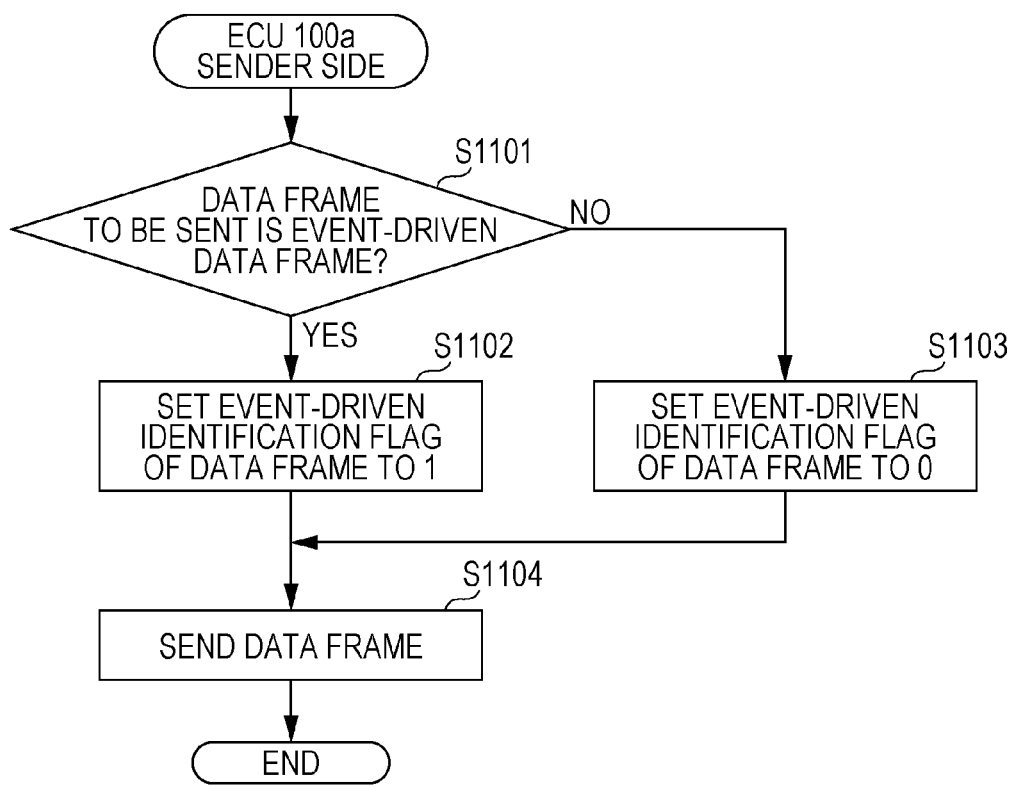
FIG. 9 is a flowchart of a data frame transmission process according to the first embodiment.

FIG. 9 is a flowchart of a data frame transmission process performed by the ECU 100a.

The ECU 100a needs to generate a data frame at a transmission timing in accordance with the transmission period defined in the data frame generation rules (a timing at which the transmission period has elapsed since the previous transmission) or at a timing at which the sensor value received from the sensor value acquiring unit 109 varies. Thus, the ECU 100a starts the transmission process illustrated in FIG. 9. In the transmission process, the ECU 100a determines whether the data frame to be sent is an event-driven data frame or a periodically sent data frame first (step S1101).

If, in step S1101, the ECU 100a determines that the data frame to be sent is an event-driven data frame that does not follow the transmission period defined in the data frame generation rules, the ECU 100a sets the event-driven identification flag I (refer to FIG. 3) in the data field of the generated data frame to 1, which indicates that the data frame is an event-driven data frame (step S1102).

However, if, in step S1101, the ECU 100a determines that the data frame to be sent is a periodical data frame that follows the transmission period defined in the data frame generation rules (determines that the data frame is not an event-driven data frame), the ECU 100a sets the event-driven identification flag I (refer to FIG. 3) in the data field of the generated data frame to 0, which indicates that the data frame is not an event-driven data frame (step S1103).

After the ECU 100a has completed the process in step S1102 or S1103, the ECU 100a sets the latest sensor value acquired from the sensor value acquiring unit 109 in the data area of the data field. Thus, the ECU 100a generates a data frame to be sent and sends the data frame to the bus 200 (step S1104). In this manner, the data frame flows in the bus 200 and can be received by the ECU 100b.

Figure 10:
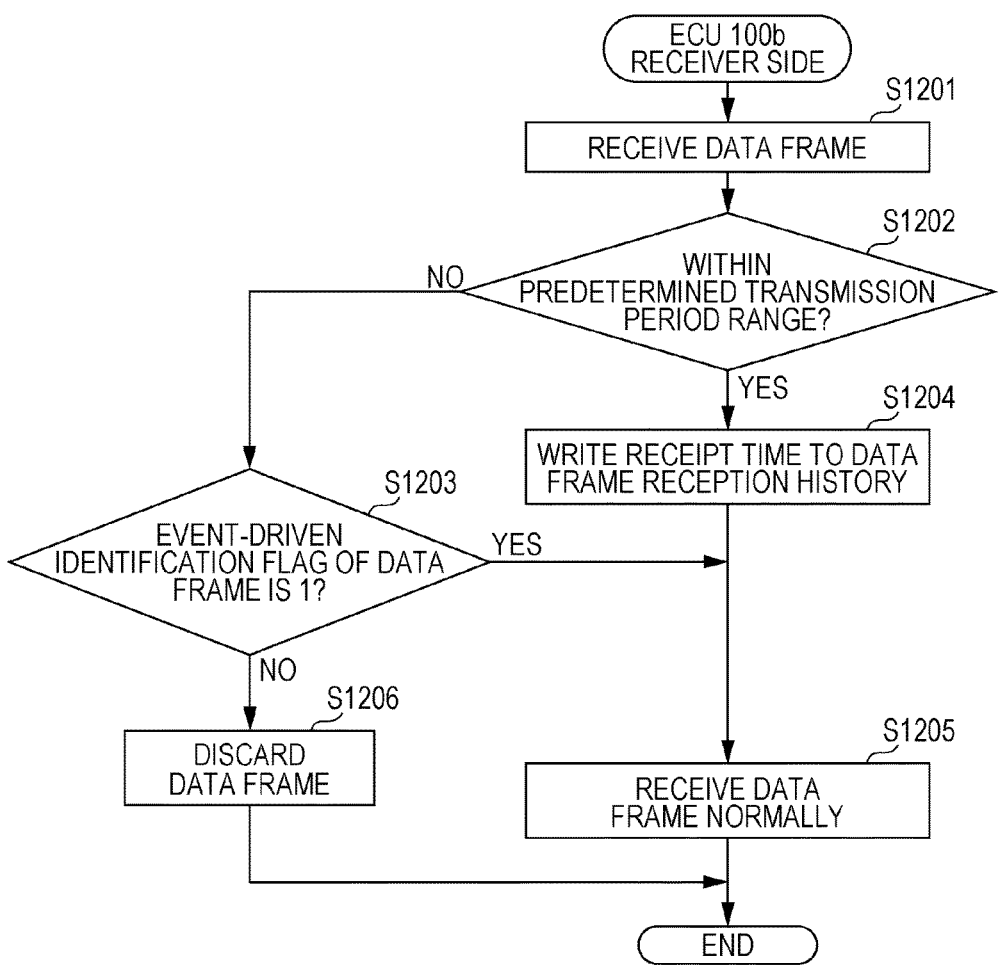
FIG. 10 is a flowchart of a data frame reception process according to the first embodiment.

FIG. 10 is a flowchart illustrating a data frame reception process performed by the ECU 100b.

The ECU 100b receives the data frame appearing in the bus 200 (step S1201). Note that if the data frame does not include the message ID to be received by ECU 100b itself, the ECU 100b discards the data frame and completes its processing. However, if the data frame includes the message ID to be received by the ECU 100b itself, the ECU 100b determines whether the reception is within a transmission period range defined in the held period rule information (step S1202). Note that the fraudulent data frame determination unit 104 of the ECU 100b determines whether the reception interval of the received data frame (i.e., the transmission period) is within a predetermined transmission period range (i.e., the reception interval satisfies the transmission period condition defined in the period rule information) using the information acquired by the timer 108, the received data frame period holding unit 105, and the data frame reception history holding unit 106. Also, note that the words "within a predetermined transmission period range" are used to refer to the condition that a difference between the previous receipt time and the receipt time of the currently received data frame (a reception interval) is greater than or equal to a value obtained by subtracting the margin from the transmission period determined for the message ID of the received data frame and is less than or equal to a value obtained by adding the margin to the transmission period.

If, in step S1202, the reception interval of the data frame is within the transmission period range, the transmission period condition is satisfied. Thus, the ECU 100b associates the message ID of the received data frame with the receipt time of the data frame and records the receipt time of the data frame in the list held by the data frame reception history holding unit 106 as the previous receipt time (i.e., updates the previous receipt time) (step S1204). After the process in step S1204 is completed, the fraudulent data frame determination unit 104 of the ECU 100b determines that the received data frame is an authorized data frame (step S1205), and the data frame processing unit 107 performs a process corresponding to the data frame.

In addition, if, in step S1202, the difference between the previous data frame receipt time and the receipt time of the currently received data frame is not within the transmission period range, the ECU 100b determines whether the event-driven identification flag I in the data field of the data frame is 1 (step S1203). If the event-driven identification flag I is 1, the fraudulent data frame determination unit 104 of the ECU 100b determines that the received data frame is an authorized data frame (step S1205) and, thus, the data frame processing unit 107 performs a process corresponding to the data frame.

However, if, in step S1203, it is determined that the event-driven identification flag I in the data field of the data frame is not 1, the ECU 100b determines that the received data frame is a fraudulent data frame and, thus, discards the data frame (step S1206). Accordingly, the ECU 100b does not process the fraudulent data frame sent from the fraudulent ECU.

Note that when, in step S1202, it is determined whether the reception interval of the data frame (i.e., the transmission period) is within the predetermined transmission period range and if the previous receipt time is not stored (e.g., at the first time of determination), the received data frame can be considered as an event-driven data frame. Thereafter, when the event-driven identification flag I is correct, the receipt time of the data frame can be recorded as the previous receipt time and, subsequently, the process in step S1205 can be performed. In such a case, at the start point of periodical transmission, such as the first transmission, the sender ECU sends an event-driven data frame. In addition, if there is a duration in which, for example, each of the ECUs enters a sleep mode and stops periodical transmission of a data frame, the data frame may be sent as an event-driven data frame when the periodical transmission resumes. In such a case, if the sender ECU enters a sleep mode and, thus, periodical transmission stops for a predetermined period of time since the previous receipt time, the receiver ECU cancels out the previous receipt time. Thereafter, the receiver ECU considers the next time as a first time and considers the received data frame as an event-driven data frame. In this manner, the receiver ECU can determine the validity of the data frame.

While the present embodiment has been described with reference to the example in which the ECU 100a sends a data frame and the ECU 100b receives the data frame, the same processing is performed when the ECU 100b sends a data frame and the ECU 100a receives the data frame. That is, the ECU 100b can perform a transmission process that is similar to the transmission process illustrated in FIG. 9, and the ECU 100a can perform a reception process that is similar to the reception process illustrated in FIG. 10.

1.6 Effect of First Embodiment

According to the first embodiment, the in-vehicle network system 10 is provided. Even when an event-driven data frame that is non-periodically sent is present in addition to a periodically sent data frame, the in-vehicle network system 10 is capable of determining whether a data frame is an authorized data frame by providing the specific identifier in the event-driven data frame. That is, the in-vehicle network system 10 determines whether a data frame is an authorized data frame using the transmission period condition. Only when it is difficult to determine whether a data frame is an authorized data frame using the transmission period condition, the in-vehicle network system 10 determines whether the data frame is an authorized data frame using the specific identifier. If a fraudulent ECU sends a data frame, it is highly likely that the data frame does not satisfy the transmission period condition. In addition, the specific identifier is not provided. Accordingly, the ECU that has received the data frame can determine that the data frame is a fraudulent data frame. Note that a data frame that is not an event-driven data frame (i.e., a periodically sent data frame) may set, in the data field, only data indicating the sensor value acquired from, for example, a device by the ECU without setting the event-driven identification flag I. In this manner, since the specific identifier need not be provided in a data frame periodically sent from an authorized ECU, the entire data field can be used.

Second Embodiment

An in-vehicle network system 11 according to another embodiment of the present disclosure that achieves a fraud detection method for appropriately detecting that a fraudulent data frame is sent between an ECU 2100a and an ECU 2100b that communicate data frames to each other under the condition that a non-periodical event-driven data frame can be sent in addition to a periodically sent data frame is described below with reference to the accompanying drawings.

2.1 Overall Configuration of In-Vehicle Network System 11

Figure 11:
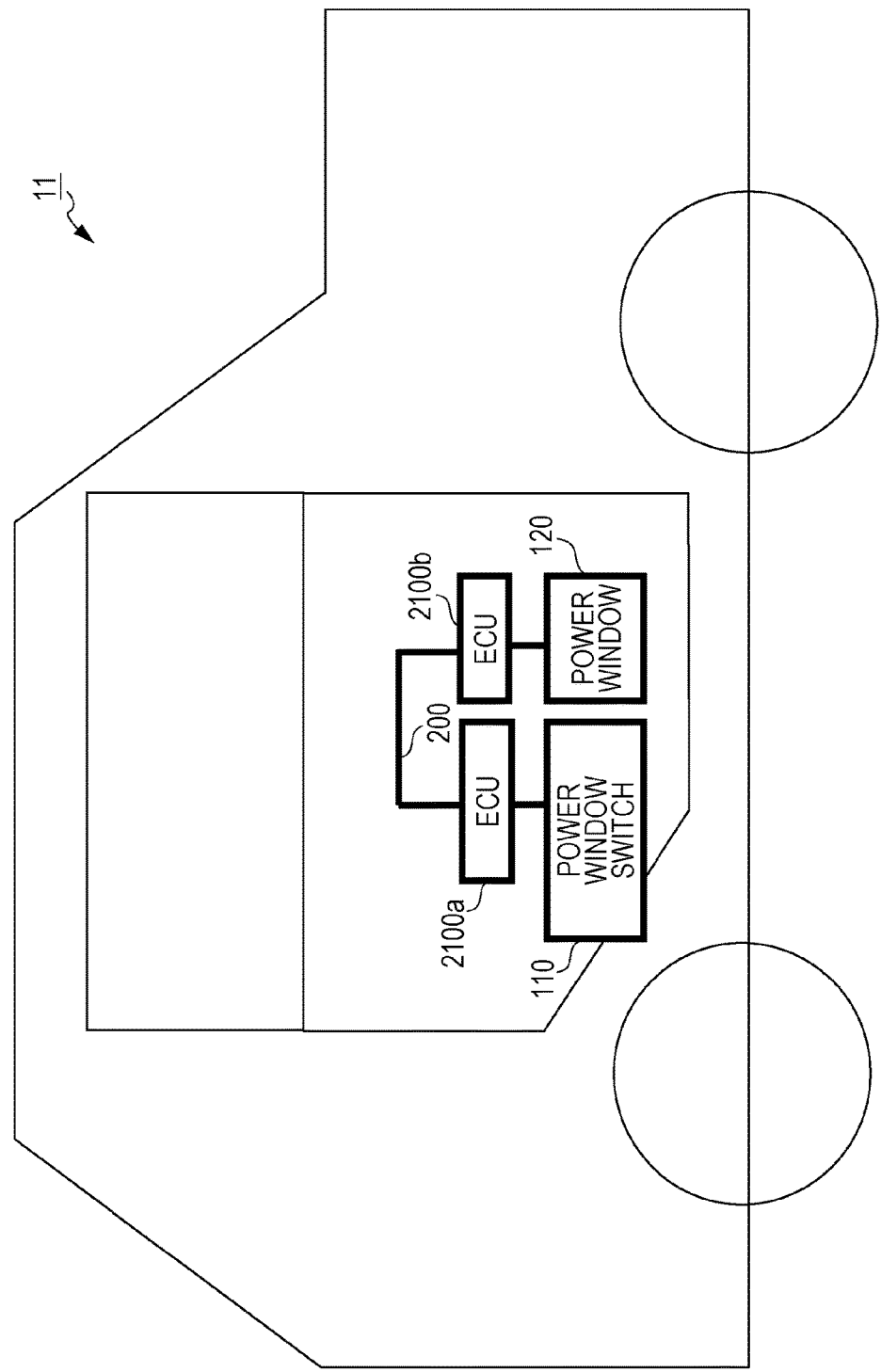
FIG. 11 illustrates the overall configuration of an in-vehicle network system according to a second embodiment.

FIG. 11 illustrates the overall configuration of the in-vehicle network system 11 according to a second embodiment. The in-vehicle network system 11 is formed by partially modifying the in-vehicle network system 10 according to the first embodiment. The in-vehicle network system 11 is a network communication system of a motor vehicle having a variety of devices, such as a control unit and a sensor mounted therein. The in-vehicle network system 11 includes the ECUs 2100a and 2100b connected to a variety of devices and a bus 200 that connects the ECUs to each another. Among the constituent elements of the in-vehicle network system 11, the constituent element having a function that is the same as that of the in-vehicle network system 10 according to the first embodiment is identified with the same reference numeral, and description of the constituent element is not repeated. The ECU is a device including, for example, digital circuits, such as a processor (a microprocessor) and a memory, analog circuits, and a communication circuit. Hereinafter, description is given under the assumption that a fraudulent ECU that sends a fraudulent data frame may be connected to the bus 200.

The ECU 2100a is formed by partially modifying the ECU 100a according to the first embodiment. The ECU 2100a is connected to a power window switch 110. The ECU 2100a periodically sends, to the bus 200, a data frame including information indicating the state of the power window switch 110. In addition, if the state of the power window switch 110 varies, the ECU 2100a sends a data frame including the information indicating the state of the power window switch 110 (i.e., the information indicating a sensor value) to the bus 200. Accordingly, in addition to repeatedly sending the data frame at predetermined transmission periods, the ECU 2100a sends a non-periodical event-driven data frame to the bus 200 if the time at which the state of the power window switch 110 varies does not exactly match the transmission period. Furthermore, the ECU 2100a receives a data frame that is sent from the ECU 2100b to the bus 200 and that flows in the bus 200. Thereafter, the ECU 2100a verifies that, for example, the data frame sent from the ECU 2100a has been properly received.

The ECU 2100b is formed by partially modifying the ECU 100b according to the first embodiment. The ECU 2100b is connected to a power window 120. The ECU 2100b receives a data frame that is sent from the ECU 2100a to the bus 200 and that flows in the bus 200. Thereafter, the ECU 2100b controls the power window 120 to open or close in accordance with the state of the power window switch 110 included in the data frame. In addition, the ECU 2100b periodically sends a data frame in accordance with the open/close control state of the power window 120 to the bus 200. In the in-vehicle network system 11, each of the ECUs sends and receives a frame in accordance with CAN protocol. The ECUs have a function of determining whether the received data frame is a fraudulent data frame.

2.2 Data Field Format

The data field of a data frame used in the in-vehicle network system 11 is described below.

Figure 12:
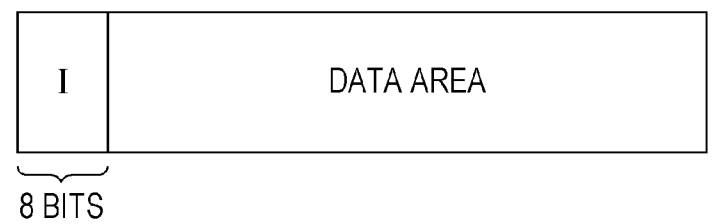
FIG. 12 illustrates an example of the data field format used in the in-vehicle network system according to the second embodiment.

FIG. 12 illustrates an example of the data field format used in the in-vehicle network system 11. As illustrated in FIG. 12, the most significant 8 bits "I" (the first 8 bits) of the data field is a counter that increments its value each time an event-driven data frame is sent (hereinafter referred to as an "event counter"). The value of the event counter I remains unchanged when a periodical data frame is sent. In contrast, the value of the event counter I is incremented by one each time an event-driven data frame is sent. Note that exceptionally, when the value of the event counter I is the highest value (the highest 8-bit value) and if the value of the event counter is incremented by one, the value is set to the lowest value. The event counter I serves as the specific identifier used by the receiver of the data frame to identify whether the data frame is an authorized event-driven data frame. The data area that follows the event counter I includes data indicating the sensor value acquired from, for example, a device by the ECU (e.g., a value indicating the state of the power window switch 110 in the data frame sent from the ECU 2100a). In an example illustrated in FIG. 12, the most significant 8 bits serve as the event counter I. However, the event counter I may be placed at any bit position (e.g., the least significant 8 bits) in the data field. In this example, the length of the event counter I is 8 bits. However, the length is not limited to 8 bits. Any length may be employed.

2.3 Configuration of ECU

Figure 13:
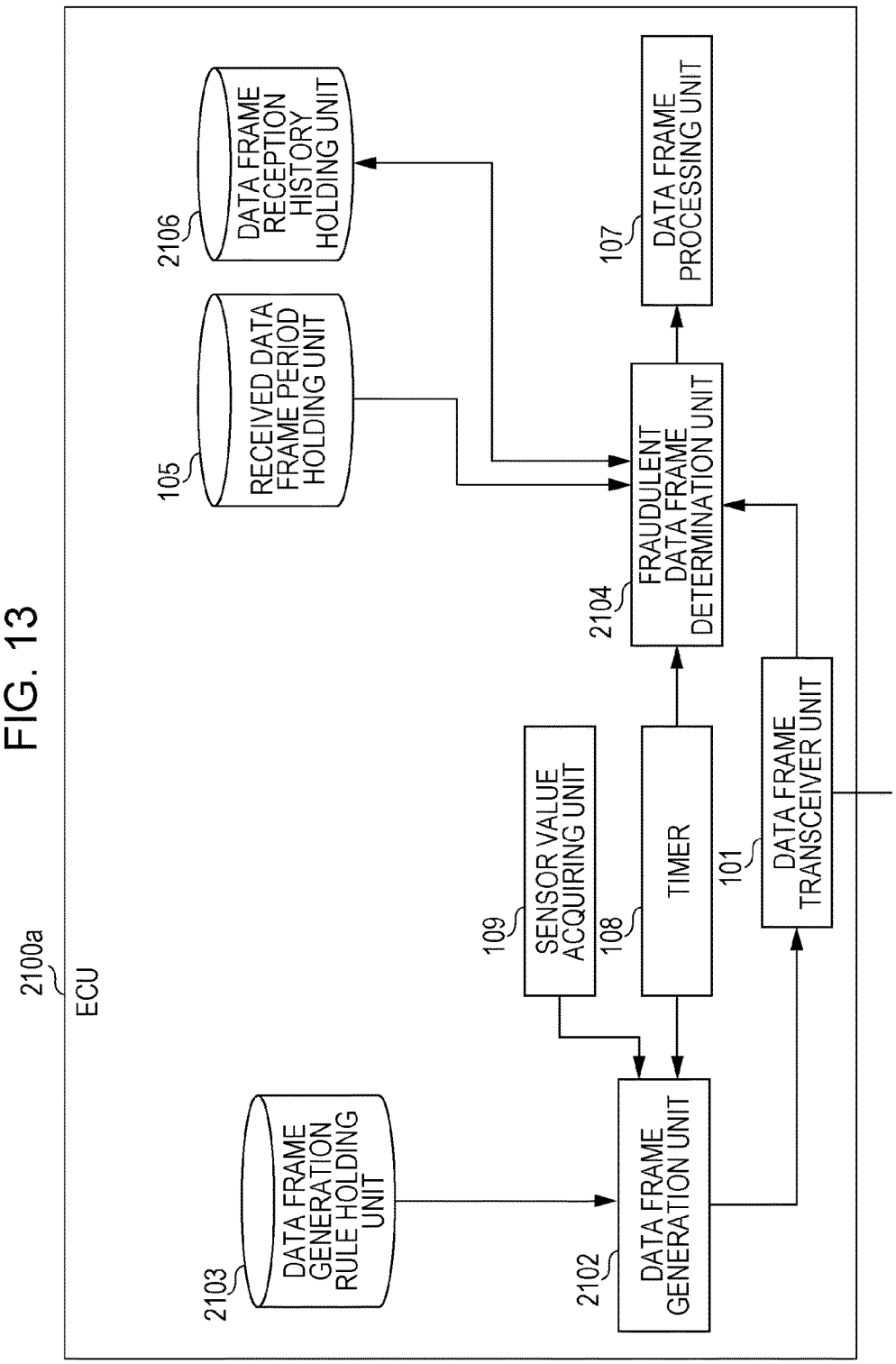
FIG. 13 illustrates the configuration of an ECU according to the second embodiment.

FIG. 13 is the configuration diagram of the ECU 2100a. The ECU 2100a includes a data frame transceiver unit 101, a data frame generation unit 2102, a data frame generation rule holding unit 2103, a fraudulent data frame determination unit 2104, a received data frame period holding unit 105, a data frame reception history holding unit 2106, a data frame processing unit 107, a timer 108, and a sensor value acquiring unit 109. Among the constituent elements of the ECU 2100a, the constituent element having a function that is the same as that of the ECU 100a according to the first embodiment is identified with the same reference numeral, and description of the constituent element is not repeated. These constituent elements are functional constituent elements. The functions are realized by the communication circuit and one of, for example, the processor that executes the control program stored in the memory and a digital circuit of the ECU 2100a. Note that the ECU 2100b has substantially the same configuration as that of the ECU 2100a. However, the information stored in each of the data frame generation rule holding unit 2103, the received data frame period holding unit 105, and the data frame reception history holding unit 2106 may differ on an ECU basis. In addition, the processing performed by the data frame processing unit 107 differs on an ECU basis.

The data frame generation unit 2102 generates a data frame in accordance with data frame generation rules stored in the data frame generation rule holding unit 2103 and sends the generated data frame to the data frame transceiver unit 101. The data frame generation unit 2102 acquires the current time from the timer 108. In addition, the data frame generation unit 2102 acquires, from the sensor value acquiring unit 109, the data regarding a device (the power window switch 110) connected to the ECU 2100a (i.e., the sensor value). To periodically send a data frame from the ECU 2100a, the data frame generation unit 2102 determines the timing at which the data frame is generated using the current time and the transmission period stored in the data frame generation rule holding unit 2103 and periodically generates the data frame. Note that after the data frame is generated by the data frame generation unit 2102, the data frame is sent to the data frame transceiver unit 101. The data frame transceiver unit 101 sends the data frame. In addition, if a point in time at which the sensor value acquired from the sensor value acquiring unit 109 varies differs from the above-described periodical timing, the data frame generation unit 2102 generates an event-driven data frame. Accordingly, a data frame is periodically sent from the ECU 2100a to the bus 200 by the data frame transceiver unit 101. In addition, an event-driven data frame is non-periodically sent by the data frame transceiver unit 101. The data frame generation unit 2102 sets the value of the transmission event counter for each of the message IDs, which is stored in the data frame generation rule holding unit 2103, in the data field of each of the data frame to be periodically sent and the event-driven data frame as the event counter I. Note that when generating an event-driven data frame, the data frame generation unit 2102 increments the value of the transmission event counter stored in the data frame generation rule holding unit 2103 by one before generating the data frame. Like the data frame generation unit 102 according to the first embodiment, the data frame generation unit 2102 generates a data frame having a specific identifier called an event counter provided therein when sending the data frame at a timing that does not follow the data frame generation rule indicating the transmission period. That is, the data frame generation unit 2102 has the function of a providing unit.

The data frame generation rule holding unit 2103 is formed from a storage medium, such as a memory. The data frame generation rule holding unit 2103 store, as the data frame generation rule, the transmission period used to periodically send a data frame for each of the message IDs sent from the ECU 2100a. In addition, the data frame generation rule holding unit 2103 provides the transmission event counter indicating the number of sent event-driven data frames in the data frame generation rules. The transmission event counter is used as a value set in the event counter of the data field when the data frame is sent. When sending an event-driven data frame, the data frame generation unit 2102 increments the transmission event counter by one. The value of the transmission event counter is used as the event counter I in the data field. FIG. 14 illustrates an example of the data frame generation rule and the transmission event counter stored in the data frame generation rule holding unit 2103. In this case, the ECU 2100a sends a plurality of types of data frame (a type of data frame identified by the message ID), such as the data frame indicating the state of the power window switch 110. In the example in FIG. 14, the transmission period of a data frame that is periodically sent from the ECU 2100a and that has a message ID of 0x100 is 50 ms, and the current transmission event counter of the data frame is 15 (e.g., a value indicating that an event-driven data frame has been sent 15 times). The transmission period of a data frame having a message ID of 0x200 is 100 ms, and the current transmission event counter of the data frame is 0 (e.g., a value indicating that no event-driven data frame has been sent). The transmission period of a data frame having a message ID of 0x300 is 300 ms, and the current transmission event counter of the data frame is 5.

The fraudulent data frame determination unit 2104 determines whether the received data frame is an authorized data frame (not a fraudulent data frame). That is, the fraudulent data frame determination unit 2104 refers to the period rule information in the received data frame period holding unit 105 and verifies whether the data frame satisfies a transmission period condition predetermined for each of the message IDs. If the data frame satisfies the transmission period condition, the fraudulent data frame determination unit 2104 determines that the data frame is a data frame sent from an authorized ECU (i.e., an authorized data frame). In addition, even when the data frame does not satisfy the transmission period condition, the fraudulent data frame determination unit 2104 compares the value of a reception event counter stored in the data frame reception history holding unit 2106 with the value of the event counter I included in the received data frame. If it is determined that the value of the event counter I is an expected value for the authorized event-driven data frame, the fraudulent data frame determination unit 2104 determines that the data frame is an event-driven data frame sent from an authorized ECU (i.e., an authorized data frame). That is, like the fraudulent data frame determination unit 104 according to the first embodiment, if a data frame that does not follow the period rule information corresponding to the data frame generation rule indicating the transmission period is received by the data frame transceiver unit 101, the fraudulent data frame determination unit 2104 verifies the specific identifier called the event counter in the data frame. That is, the fraudulent data frame determination unit 2104 has a function of a verifying unit. If the value of the event counter I included in the received data frame is the same as the value obtained by incrementing the value of the reception event counter by one, the value is an expected value for an authorized event-driven data frame. Thus, it is determined that the data frame is an authorized data frame. When the received data frame does not satisfy the predetermined transmission period condition and if the received data frame is not identified as an authorized event-driven data frame from the event counter I, the fraudulent data frame determination unit 2104 determines that the received data frame is a fraudulent data frame. If it is determined that the received data frame is an authorized data frame, the fraudulent data frame determination unit 2104 causes the data frame processing unit 107 to process the data frame. However, if it is determined that the received data frame is a fraudulent data frame, the fraudulent data frame determination unit 2104 discards the data frame (i.e., inhibits the data frame processing unit 107 from processing the data frame). In addition, if the fraudulent data frame determination unit 2104 receives the data frame that satisfies the transmission period condition, the fraudulent data frame determination unit 2104 stores the receipt time in the data frame reception history holding unit 2106 as the previous receipt time.

The data frame reception history holding unit 2106 is formed from a storage medium, such as a memory. The data frame reception history holding unit 2106 holds a list of the message IDs of data frames periodically and normally received by the ECU 2100a itself (i.e., the periodically received authorized data frame) with their previous receipt times, where the previous receipt time is the latest time of periodical receipt of the data frame. The entry of the list of the message IDs further includes the reception event counter indicating the number of receptions of an event-driven data frame received as an authorized data frame. FIG. 15 illustrates an example of a list of the message IDs of data frames periodically received as authorized data frames with the previous receipt time of the data frame and the reception event counter. In FIG. 15, an example of a list held by the data frame reception history holding unit 2106 of the ECU 2100b is illustrated. In this example, the latest time (the previous receipt time) at which a periodical data frame having a message ID of 0x100 is received is 200 ms. The reception event counter corresponding to the event-driven data frame having a message ID of 0x100 is currently 15 (e.g., a value indicating that, for example, an event-driven data frame has been received 15 times). The previous receipt time at which a periodical data frame having a message ID of 0x200 is received is 220 ms. The reception event counter corresponding to the event-driven data frame having a message ID of 0x200 is currently 0 (e.g., a value indicating that, for example, no event-driven data frame has been received). The previous receipt time at which a periodical data frame having a message ID of 0x300 is received is 230 ms. The reception event counter is currently 5.

2.4 Data Frame Transmission Process Performed by ECU

The data frame transmission process performed by the ECU 2100a under the condition that the ECU 2100a sends a data frame to the bus 200 and the ECU 2100b receives the data frame from the bus 200 is described below.

Figure 16:
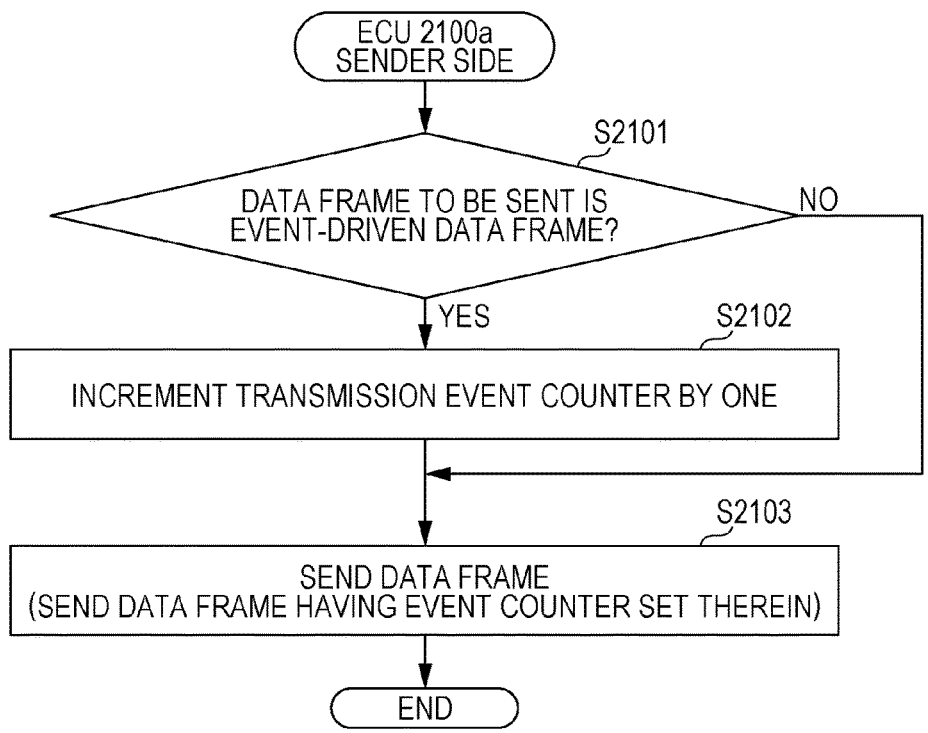
FIG. 16 is a flowchart of a data frame transmission process according to the second embodiment.

FIG. 16 is a flowchart of a data frame transmission process performed by the ECU 2100a.

The ECU 2100a needs to generate a data frame at a transmission timing in accordance with the transmission period defined in the data frame generation rules (a timing at which the transmission period has elapsed since the previous transmission) or at a timing at which the sensor value from the sensor value acquiring unit 109 varies. Thus, the ECU 2100a starts the transmission process illustrated in FIG. 16. In the transmission process, the ECU 2100a determines whether the data frame to be sent is an event-driven data frame or a periodical data frame first (step S2101).

If, in step S2101, the ECU 2100a determines that the data frame to be sent is an event-driven data frame that does not follow the transmission period defined in the data frame generation rules, the ECU 2100a increments the value of the transmission event counter stored in the data frame generation rule holding unit 2103 by one (step S2102). However, if, in step S2101, the ECU 2100a determines that the data frame to be sent is a periodical data frame that follows the transmission period defined in the data frame generation rules (i.e., not an event-driven data frame), the ECU 2100a skips the process in step S2102 in which the value of the transmission event counter is incremented.

After the ECU 2100a has completed the process in step S2102 or has skipped the process in step S2102, the ECU 2100a sets the event counter I of the data field to the value of the transmission event counter and sets, in the data area of the data field, the latest sensor value acquired from the sensor value acquiring unit 109. Thus, the ECU 2100a generates a data frame to be sent and sends the data frame to the bus 200 (step S2103). In this manner, the data frame flows in the bus 200 and can be received by the ECU 2100b.

Note that the ECU 2100b can perform a transmission process that is similar to the transmission process illustrated in FIG. 16.

2.5 Data Frame Reception Process Performed by ECU

The data frame reception process performed by the ECU 2100b under the assumption that the ECU 2100a sends a data frame to the bus 200 and the ECU 2100b receives the data frame from the bus 200 is described below.

Figure 17:
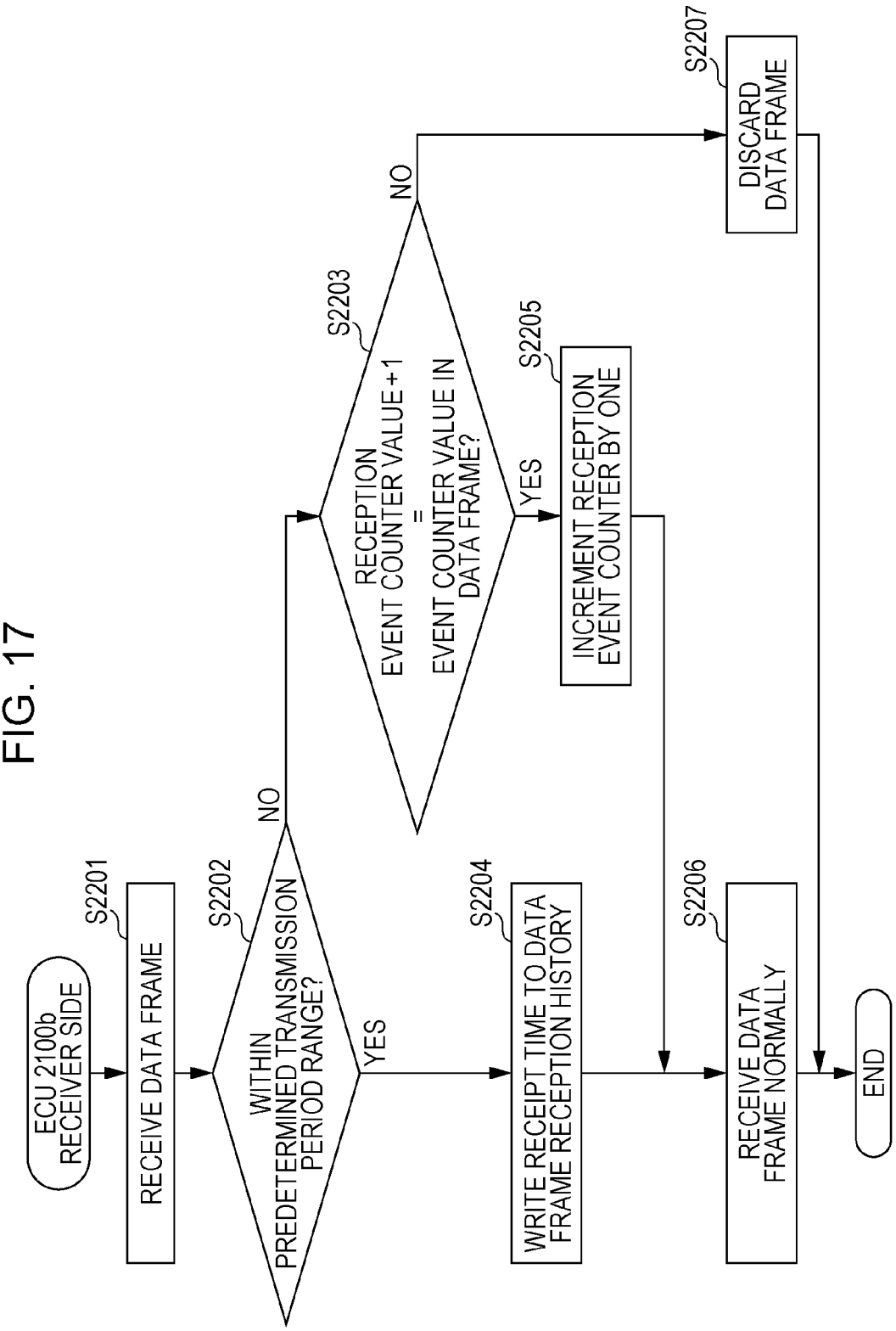
FIG. 17 is a flowchart of a data frame reception process according to the second embodiment.

FIG. 17 is a flowchart of a data frame reception process performed by the ECU 2100b.

The ECU 2100b receives the data frame appearing in the bus 200 (step S2201). Note that if the data frame does not include the message ID to be received by ECU 2100b itself, the ECU 2100b discards the data frame and completes its processing. However, if the ECU 2100b has received the data frame having a message ID to be received by the ECU 2100b itself, the ECU 2100b determines whether the reception is within a transmission period range defined in the held period rule information (step S2202). Note that the fraudulent data frame determination unit 2104 of the ECU 2100b determines whether the reception interval of the received data frame (i.e., the transmission period) is within a predetermined transmission period range (i.e., the reception period satisfies the transmission period condition defined in the period rule information) using the information acquired by the timer 108, the received data frame period holding unit 105, and the data frame reception history holding unit 106. That is, the fraudulent data frame determination unit 2104 determines whether the difference between the previous receipt time and the receipt time of the currently received data frame (the reception interval) is greater than or equal to a value obtained by subtracting the margin from the transmission period determined for the message ID of the received data frame and is less than or equal to a value obtained by adding the margin to the transmission period.

If, in step S2202, the reception interval of the data frame is within the transmission period range, the transmission period condition is satisfied. Thus, the ECU 2100b associates the message ID of the received data frame with the receipt time of the data frame and records the receipt time of the data frame in the list held by the data frame reception history holding unit 2106 as the previous receipt time (i.e., updates the previous receipt time) (step S2204). After the process in step S2204 is completed, the fraudulent data frame determination unit 2104 of the ECU 2100b determines that the received data frame is an authorized data frame (step S2206), and the data frame processing unit 107 performs a process corresponding to the data frame.

In addition, if, in step S2202, the difference between the previous data frame receipt time and the receipt time of the currently received data frame is not within the transmission period range, the ECU 2100b determines whether the event counter I of the data field of the data frame is the same as a value obtained by incrementing the value of the reception event counter stored in the data frame reception history holding unit 2106 by one (step S2203). If the event counter I is the same as the value, the ECU 2100b increments the value of the reception event counter by one (step S2205). Subsequently, the fraudulent data frame determination unit 2104 of the ECU 2100b determines that the received data frame is an authorized data frame (step S2206) and, thus, the data frame processing unit 107 performs a process corresponding to the data frame.

However, if, in step S2203, it is determined that the event counter I is not the same as the value, the ECU 2100b determines that the received data frame is a fraudulent data frame and, thus, discards the data frame (step S2207). Accordingly, the ECU 2100b does not process the fraudulent data frame sent from the fraudulent ECU.

Note that when, in step S2202, it is determined whether the reception interval of the data frame (i.e., the transmission period) is within the predetermined transmission period range and if the previous receipt time is not stored (e.g., at the first time of determination), the received data frame can be considered as an event-driven data frame. Thereafter, when the event counter is correct, the reception event counter can be incremented by one and, subsequently, the receipt time of the data frame can be recorded as the previous receipt time. Subsequently, the process in step S2206 can be performed. In such a case, at the start point of periodic transmission, such as the first transmission, the sender ECU sends an event-driven data frame. In addition, if there is a duration in which, for example, each of the ECUs enters a sleep mode and stops periodical transmission of a data frame, the data frame may be sent as an event-driven data frame when the periodical transmission resumes. In such a case, if the sender ECU enters a sleep mode and, thus periodical transmission stops for a predetermined period of time since the previous receipt time, the receiver ECU cancels out the previous receipt time. Thereafter, the receiver ECU considers the next time as a first time and considers the received data frame as an event-driven data frame. In this manner, the receiver ECU can determine the validity of the data frame.

In addition, the ECU 2100a can perform a reception process that is similar to the reception process illustrated in FIG. 17.

2.6 Effect of Second Embodiment

According to the second embodiment, the in-vehicle network system 11 is provided. Even when an event-driven data frame that is non-periodically sent is present in addition to a periodically sent data frame, the in-vehicle network system 11 is capable of determining whether a data frame is an authorized data frame by providing the specific identifier (i.e., the event counter) in the event-driven data frame. That is, the in-vehicle network system 11 determines whether a data frame is an authorized data frame using the transmission period condition. Only when it is difficult to determine whether a data frame is an authorized data frame using the transmission period condition, the in-vehicle network system 11 determines whether the data frame is an authorized data frame using the specific identifier. Since the event counter is not a fixed value, it is difficult for a fraudulent ECU to provide a value that is the same as the event counter in the data frame. If the fraudulent ECU sends a data frame, it is highly likely that the data frame does not satisfy the transmission period condition. In addition, since it is not easy for the fraudulent ECU to correctly set the event counter, an ECU that has received the data frame can determine that the received data frame is a fraudulent data frame. Note that a data frame that is not an event-driven data frame (i.e., a periodically sent data frame) may contain, in the data field, only data indicating the sensor value acquired from, for example, a device by the ECU without including the event counter I. In this manner, since the specific identifier need not be provided in a data frame that is periodically sent from an authorized ECU, the entire data field can be used.

Third Embodiment

An in-vehicle network system 12 according to another embodiment of the present disclosure that achieves a fraud detection method for appropriately detecting that a fraudulent data frame is sent between an ECU 3100a and an ECU 3100b that communicate data frames to each other under the condition that a non-periodical event-driven data frame can be sent in addition to a periodically sent data frame is described below with reference to the accompanying drawings.

3.1 Overall Configuration of In-Vehicle Network System

Figure 18:
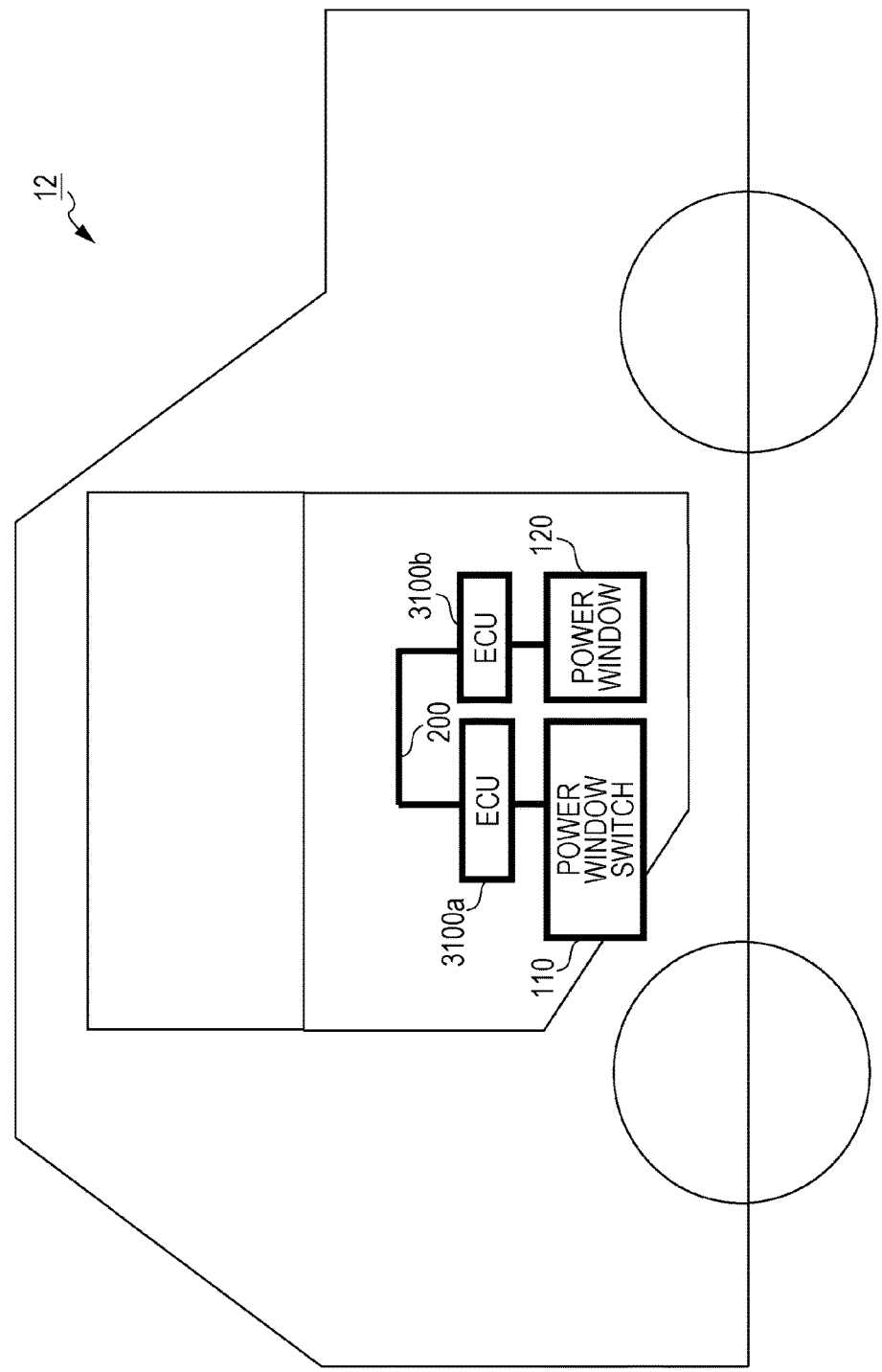
FIG. 18 illustrates the overall configuration of an in-vehicle network system according to a third embodiment.

FIG. 18 illustrates the overall configuration of the in-vehicle network system 12 according to a third embodiment. The in-vehicle network system 12 is formed by partially modifying the in-vehicle network system 10 according to the first embodiment. The in-vehicle network system 12 is a network communication system of a motor vehicle having a variety of devices, such as a control unit and a sensor mounted therein. The in-vehicle network system 12 includes the ECUs 3100a and 3100b connected to a variety of devices and a bus 200 that connects the ECUs to one another. Among the constituent elements of the in-vehicle network system 12, the constituent element having a function that is the same as that of the in-vehicle network system 10 according to the first embodiment is identified with the same reference numeral, and description of the constituent element is not repeated. The ECU is a device including, for example, digital circuits, such as a processor (a microprocessor) and a memory, analog circuits, and a communication circuit. Hereinafter, description is given under the assumption that a fraudulent ECU that sends a fraudulent data frame may be connected to the bus 200.

The ECU 3100a is formed by partially modifying the ECU 100a according to the first embodiment. The ECU 3100a is connected to a power window switch 110. The ECU 3100a periodically sends, to the bus 200, a data frame including information indicating the state of the power window switch 110. In addition, if the state of the power window switch 110 varies, the ECU 3100a sends a data frame including the information indicating the state of the power window switch 110 (i.e., the information indicating a sensor value) to the bus 200. Accordingly, in addition to repeatedly sending a data frame at predetermined transmission periods, the ECU 3100a sends a non-periodical event-driven data frame to the bus 200 if the time at which the state of the power window switch 110 varies does not exactly match the transmission period. Furthermore, the ECU 3100a receives a data frame that is sent from the ECU 3100b to the bus 200 and that flows in the bus 200. Thereafter, the ECU 3100a verifies that, for example, the data frame sent from the ECU 3100a has been correctly received.

The ECU 3100b is formed by partially modifying the ECU 100b according to the first embodiment. The ECU 3100b is connected to a power window 120. The ECU 3100b receives a data frame that is sent from the ECU 2100a to the bus 200 and that flows in the bus 200. Thereafter, the ECU 3100b controls the power window 120 to open or close in accordance with the state of the power window switch 110 included in the data frame. In addition, the ECU 3100b periodically sends a data frame in accordance with the open/close control state of the power window 120 to the bus 200. In the in-vehicle network system 12, each of the ECUs sends and receives a frame in accordance with CAN protocol. The ECUs have a function of determining whether the received data frame is a fraudulent data frame.

3.2 Data Field Format

The data field of a data frame used in the in-vehicle network system 12 is described below.

Figure 19:
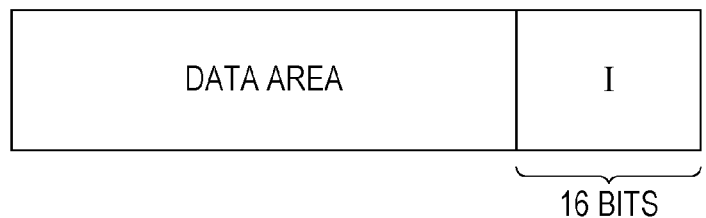
FIG. 19 illustrates an example of the data field format used in the in-vehicle network system according to the third embodiment.

FIG. 19 illustrates an example of the data field format used in the in-vehicle network system 12. The example illustrated in FIG. 19 is an example in the case of an event-driven data frame. The least significant 16 bits "I" (the last 16 bits) of the data field serve as a MAC field I that stores a Message Authentication Code (MAC). The information as to whether the data field of an event-driven data frame includes the MAC field I and the position and the length of the MAC field I when the MAC field I is included are defined by an event-driven data frame format (described in more detail below) of the data frame generation rules stored in a data frame generation rule holding unit 3103. If an event-driven data frame is generated and sent, MAC is set in the MAC field I in accordance with the event-driven data frame format stored in the data frame generation rule holding unit 3103. MAC serves as a specific identifier used to identify whether the event-driven data frame is an authorized event-driven data frame. When a periodical data frame is generated and sent, MAC need not be set in the data field. Instead of MAC, a fixed value may be set in the data field. However, the entire data field may be used as a data area without setting MAC or the alternative data. In this example, description is given with reference to a periodical data frame that does not include MAC and an event-driven data frame that includes MAC. The data area, which is the area of the data field other than the MAC field I (refer to FIG. 19), contains the data indicating the sensor value acquired from, for example, a device by the ECU (e.g., a value indicating the state of the power window switch 110 in the data frame sent from the ECU 3100a). In an example illustrated in FIG. 19, the least significant 16 bits serve as the MAC field I. However, the MAC field I may be placed at any bit position (e.g., the most significant 16 bits) in the data field if the information is defined by the event-driven data frame format. In addition, the size of MAC may be set to a size other than 16 bits.

3.3 Configuration of ECU

Figure 20:
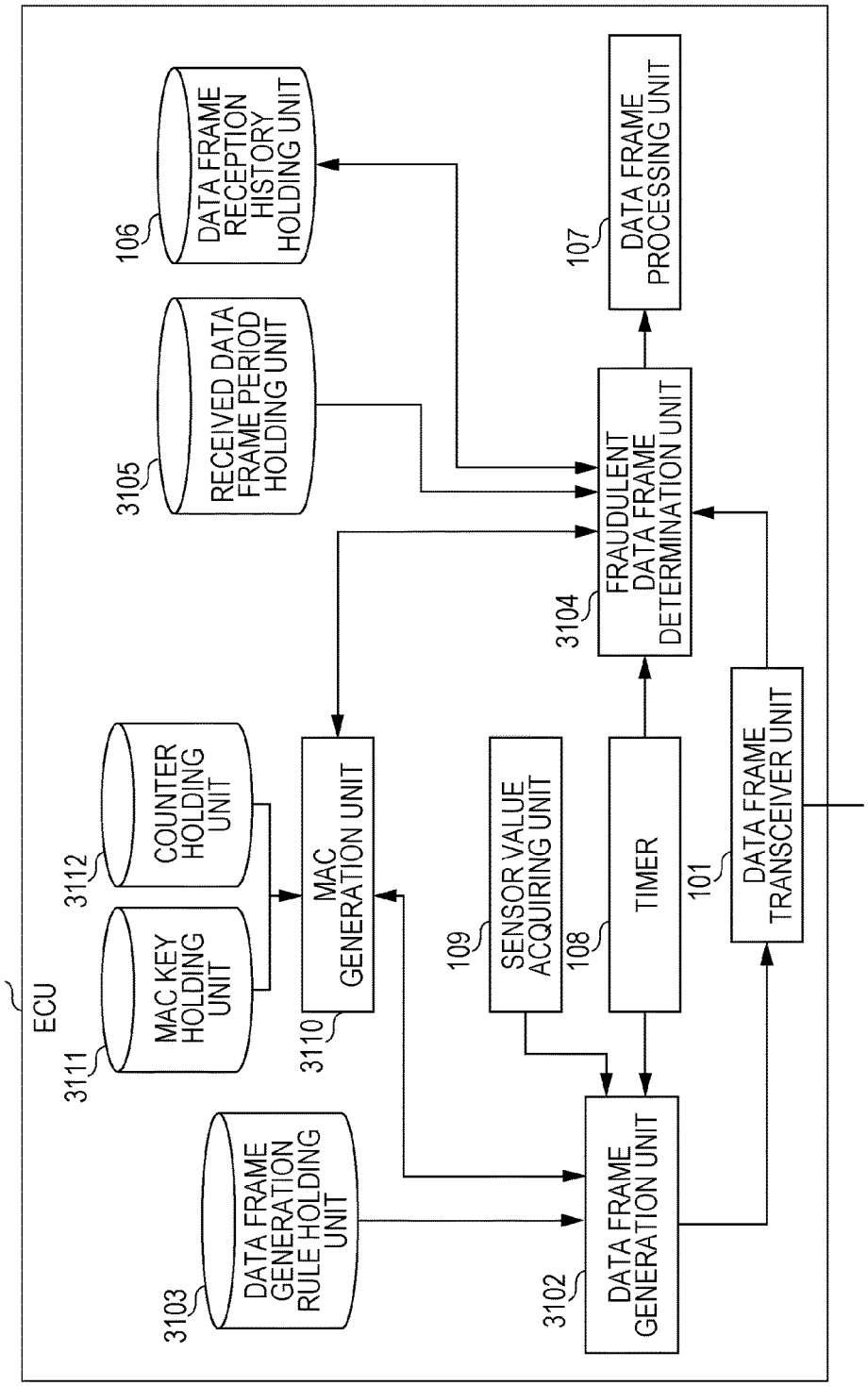
FIG. 20 illustrates the configuration of an ECU according to the third embodiment.

FIG. 20 illustrates the configuration of the ECU 3100a. The ECU 3100a includes a data frame transceiver unit 101, a data frame generation unit 3102, the data frame generation rule holding unit 3103, a fraudulent data frame determination unit 3104, a received data frame period holding unit 3105, a data frame reception history holding unit 106, a data frame processing unit 107, a timer 108, a sensor value acquiring unit 109, a MAC generation unit 3110, a MAC key holding unit 3111, and a counter holding unit 3112. Among the constituent elements of the ECU 3100a, the constituent element having a function that is the same as that of the ECU 100a according to the first embodiment is identified with the same reference numeral, and description of the constituent element is not repeated. These constituent elements are functional constituent elements. The functions are realized by the communication circuit of the ECU 3100a and one of, for example, the processor that executes the control program stored in the memory and a digital circuit. Note that the ECU 3100b has substantially the same configuration as that of the ECU 3100a. However, the information stored in each of the data frame generation rule holding unit 3103, the received data frame period holding unit 3105, and the data frame reception history holding unit 106 may differ on an ECU basis. In addition, the processing performed by the data frame processing unit 107 differs on an ECU basis.

The data frame generation unit 3102 generates a data frame in accordance with data frame generation rules stored in the data frame generation rule holding unit 3103 and sends the generated data frame to the data frame transceiver unit 101. The data frame generation unit 3102 acquires the current time from the timer 108. In addition, the data frame generation unit 3102 acquires, from the sensor value acquiring unit 109, the data regarding a device (the power window switch 110) connected to the ECU 3100a (i.e., the sensor value). To periodically send the data frame from the ECU 3100a, the data frame generation unit 3102 determines the timing at which the data frame is generated using the current time and the transmission period stored in the data frame generation rule holding unit 3103 and periodically generates the data frame. Note that after the data frame is generated by the data frame generation unit 3102, the data frame is sent to the data frame transceiver unit 101. The data frame transceiver unit 101 sends the data frame. In addition, if a point in time at which the sensor value acquired from the sensor value acquiring unit 109 varies differs from the above-described periodical timing, the data frame generation unit 3102 generates an event-driven data frame. To generate the event-driven data frame, the data frame generation unit 3102 sets MAC in the data frame in accordance with the event-driven data frame format of the data frame generation rules for each of the message IDs stored in the data frame generation rule holding unit 3103. The MAC is obtained by rounding down the value acquired from the MAC generation unit 3110 by sending, to the MAC generation unit 3110, the message ID of the data frame to be generated and the data (the sensor value) stored in the data area of the data field so that the value has the data length (the bit length) defined by the event-driven data frame format. As a result of generation of the data frame by the data frame generation unit 3102, the data frame is periodically sent from the ECU 3100a to the bus 200 by the data frame transceiver unit 101. In addition, the event-driven data frame is non-periodically sent. Like the data frame generation unit 102 according to the first embodiment, the data frame generation unit 3102 generates a data frame having a specific identifier called MAC provided therein when sending the data frame at a timing that does not follow the data frame generation rule indicating the transmission period. That is, the data frame generation unit 3102 functions as a providing unit.

The data frame generation rule holding unit 3103 is formed from a storage medium, such as a memory. The data frame generation rule holding unit 3103 stores, as the data frame generation rules, the transmission period used to periodically send a data frame for each of the message IDs sent from the ECU 3100a and the event-driven data frame format indicating, for example, the position at which MAC is stored and the data length. FIG. 21 illustrates an example of the data frame generation rules stored in the data frame generation rule holding unit 3103. In this case, the ECU 3100a sends a plurality of types of data frame (a type of data frame identified by the message ID), such as the data frame indicating the state of the power window switch 110. In the example in FIG. 21, the transmission period of a data frame that is periodically sent from the ECU 3100a and that has a message ID of 0x100 is 50 ms. If the data frame is sent as an event-driven data frame that does not follow the transmission period, MAC needs to be stored in the least significant 16 bits of the data field. In addition, the transmission period of a data frame having a message ID of 0x200 is 100 ms, and an event-driven data frame having a message ID of 0x200 is not sent. Furthermore, the transmission period of a data frame that has a message ID of 0x300 and that is periodically sent from the ECU 3100a is 70 ms, If the data frame is sent as an event-driven data frame that does not follow the transmission period, MAC needs to be stored in the least significant 16 bits of the data field.

The fraudulent data frame determination unit 3104 determines whether the received data frame is an authorized data frame (not a fraudulent data frame). That is, the fraudulent data frame determination unit 3104 refers to the period rule information in the received data frame period holding unit 3105 and verifies whether the data frame satisfies a transmission period condition predetermined for each of the message IDs. If the data frame satisfies the transmission period condition, the fraudulent data frame determination unit 3104 determines that the data frame is a data frame sent from an authorized ECU (Le., an authorized data frame). In addition, even when the data frame does not satisfy the transmission period condition, the fraudulent data frame determination unit 3104 determines that the data frame is an authorized data frame as long as it is verified that an authorized MAC is included in the data field. The MAC is verified by determining whether the value acquired from the MAC generation unit 3110 by sending the message ID of the data frame and the information in the data area of the data field to the MAC generation unit 3110 is the same as the information in the MAC field I in the data field. If the value acquired from the MAC generation unit 3110 is the same as the information in the MAC field I, the verification is successful. That is, like the fraudulent data frame determination unit 104 according to the first embodiment, if a data frame that does not follow the period rule information corresponding to the data frame generation rule indicating the transmission period is received by the data frame transceiver unit 101, the fraudulent data frame determination unit 3104 verifies the specific identifier called MAC in the data frame. That is, the fraudulent data frame determination unit 3104 has a function of a verifying unit. When the received data frame does not satisfy the predetermined transmission period condition and if it is determined that the data frame is not the authorized event-driven data frame through the verification of MAC, the fraudulent data frame determination unit 3104 determines that the received data frame is a fraudulent data frame. If it is determined that the received data frame is an authorized data frame, the fraudulent data frame determination unit 3104 causes the data frame processing unit 107 to process the data frame. However, if it is determined that the received data frame is a fraudulent data frame, the fraudulent data frame determination unit 3104 discards the data frame (i.e., inhibits the data frame processing unit 107 from processing the data frame). In addition, if the fraudulent data frame determination unit 3104 receives the data frame that satisfies the transmission period condition, the fraudulent data frame determination unit 3104 stores the receipt time in the data frame reception history holding unit 106 as the previous receipt time.

The received data frame period holding unit 3105 is formed from a storage medium, such as a memory. The received data frame period holding unit 3105 stores the period rule information. The period rule information indicates a correspondence between a predetermined transmission period for each of the message IDs of the data frames received by the ECU 3100a itself and a margin indicating an allowable range used for the data frame reception period to be determined to satisfy the transmission period condition (that is, to be the same as the valid transmission period). In addition, the period rule information includes an event-driven data frame format that indicates, for example, the position and the length of MAC stored in the data field of the event-driven data frame which does not satisfy the transmission period condition. The event-driven data frame format is used by the fraudulent data frame determination unit 3104 to verify the validity of the event-driven data frame (i.e., verify the MAC). Note that the transmission period in the period rule information held by the received data frame period holding unit 3105 of an ECU on a data frame receiver side corresponds to the transmission period in the data frame generation rules held by the data frame generation rule holding unit 3103 of an ECU on the data frame sender side. In addition, the event-driven data frame format in the period rule information held by the received data frame period holding unit 3105 of an ECU on a data frame receiver side corresponds to the event-driven data frame format in the data frame generation rules held by the data frame generation rule holding unit 3103 of an ECU on the data frame sender side. FIG. 22 illustrates an example of the period rule information stored in the received data frame period holding unit 3105 of the ECU 3100b that receives a data frame sent from the ECU 3100a. In an example in FIG. 22, the transmission period of the data frame having a message ID of 0x100 is 50 ms. The transmission period of the data frame having a message ID of 0x200 is 100 ms, and the transmission period of the data frame having a message ID of 0x300 is 70 ms. In the example illustrated in FIG. 22, the margin is 1 ms for all the message IDs. Since the margin is 1 ms, the fraudulent data frame determination unit 3104 of the ECU 3100b determines that the transmission period condition is satisfied if the transmission period for the data frame having a message ID of 0x100 is in the range between 49 ms and 51 ms (inclusive). In addition, in the example illustrated in FIG. 22, the event-driven data frame format indicates that the event-driven data frame having a message ID of each of 0x100 and 0x300 has MAC provided in the least significant 16 bits of the data field. Also, the event-driven data frame format indicates that the event-driven data frame having a message ID of 0x200 is not sent.

The MAC generation unit 3110 generates MAC on the basis of the information on the data frame sent from the fraudulent data frame determination unit 3104 or the data frame generation unit 3102 (i.e., the message ID and the data in the data area of the data field) and sends the value of MAC to the sender. That is, the MAC generation unit 3110 performs HMAC (refer to RFC2104 HMAC: Keyed-Hashing for Message Authentication) calculation on a concatenation of the sent message ID, the value of data in the data area of the data field, and the counter value that is stored in the counter holding unit 3112 and that corresponds to the sent message ID using a MAC key corresponding to the sent message ID stored in the MAC key holding unit 3111. Thus, the MAC generation unit 3110 generates MAC and sends back the MAC to the sender.

The MAC key holding unit 3111 is formed from a storage medium, such as a memory. The MAC key holding unit 3111 stores an encryption key used for MAC generation for each of the message IDs of the data frames to be sent from the ECU 3100a itself. In addition, the MAC key holding unit 3111 stores an encryption key used for MAC generation for each of the message IDs of the data frames to be received by the ECU 3100a itself.

The counter holding unit 3112 is formed so as to include a storage medium, such as a memory. The counter holding unit 3112 holds a transmission counter for each of the message IDs of the data frames to be sent by the ECU 3100a itself and a reception counter for each of the message IDs of the data frames to be received by the ECU 3100a itself. Each time MAC is generated by the MAC generation unit 3110 upon receiving the information from the data frame generation unit 3102, the transmission counter corresponding to the message ID is incremented by one. In addition, each time the fraudulent data frame determination unit 3104 determines that the received data frame is not fraudulent and, thus, the data frame is sent to the data frame processing unit 107, the reception counter corresponding to the message ID is incremented by one. In this manner, the transmission counter is synchronized with the reception counter so that the value of the transmission counter held by the sender ECU that sends the event-driven data frame for each of the message IDs is the same as the value of the reception counter held by the receiver ECU for the message ID. When generating MAC for transmission of a data frame, the MAC generation unit 3110 generates the MAC using the transmission counter. When generating MAC for verification of the received data frame, the MAC generation unit 3110 generates the MAC using the reception counter.

3.4 Data Frame Transmission Process Performed by ECU

The data frame transmission process performed by the ECU 3100a under the assumption that the ECU 3100a sends a data frame to the bus 200 and the ECU 3100b receives the data frame from the bus 200 is described below.

Figure 23:
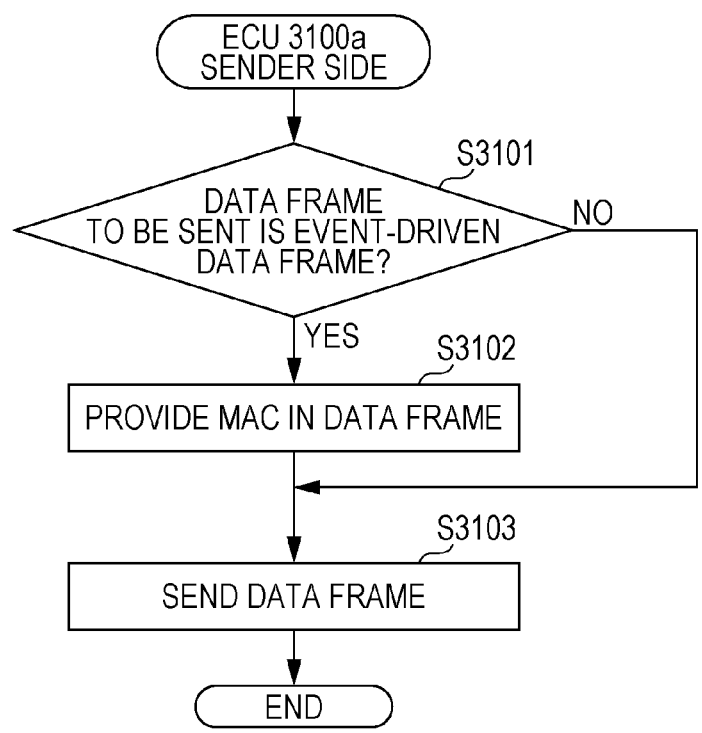
FIG. 23 is a flowchart of a data frame transmission process according to the third embodiment.

FIG. 23 is a flowchart of a data frame transmission process performed by the ECU 3100a.

The ECU 3100a needs to generate a data frame at a transmission timing in accordance with the transmission period defined in the data frame generation rules (a timing at which the transmission period has elapsed since the previous transmission) or at a timing at which the sensor value from the sensor value acquiring unit 109 varies. Thus, the ECU 3100a starts the transmission process illustrated in FIG. 23. In the transmission process, the ECU 3100a determines whether the data frame to be sent is an event-driven data frame or a periodical data frame first (step S3101).

If, in step S3101, the ECU 3100a determines that the data frame to be sent is an event-driven data frame that does not follow the transmission period defined in the data frame generation rules, the ECU 3100a provides MAC in the MAC field I of the data field of the data frame to be generated in accordance with the event-driven data frame format (step S3102).

However, if, in step S3101, the ECU 3100a determines that the data frame to be sent is a periodical data frame that follows the transmission period defined in the data frame generation rules (i.e., not an event-driven data frame), the ECU 3100a skips the process in step S3102.

After the ECU 3100a has completed the process in step S3102 or has skipped the process in step S3102, the ECU 3100a sets the latest sensor value acquired from the sensor value acquiring unit 109 in the data area of the data field to generate the data frame to be sent. Thereafter, the ECU 3100a sends the generated data frame to the bus 200 (step S3103). In this manner, the data frame flows in the bus 200 and can be received by the ECU 3100b.

Note that the ECU 3100b can perform a transmission process that is similar to the transmission process illustrated in FIG. 23.

3.5 Data Frame Reception Process Performed by ECU

The data frame reception process performed by the ECU 3100b under the assumption that the ECU 3100a sends a data frame to the bus 200 and the ECU 3100b receives the data frame from the bus 200 is described below.

Figure 24:
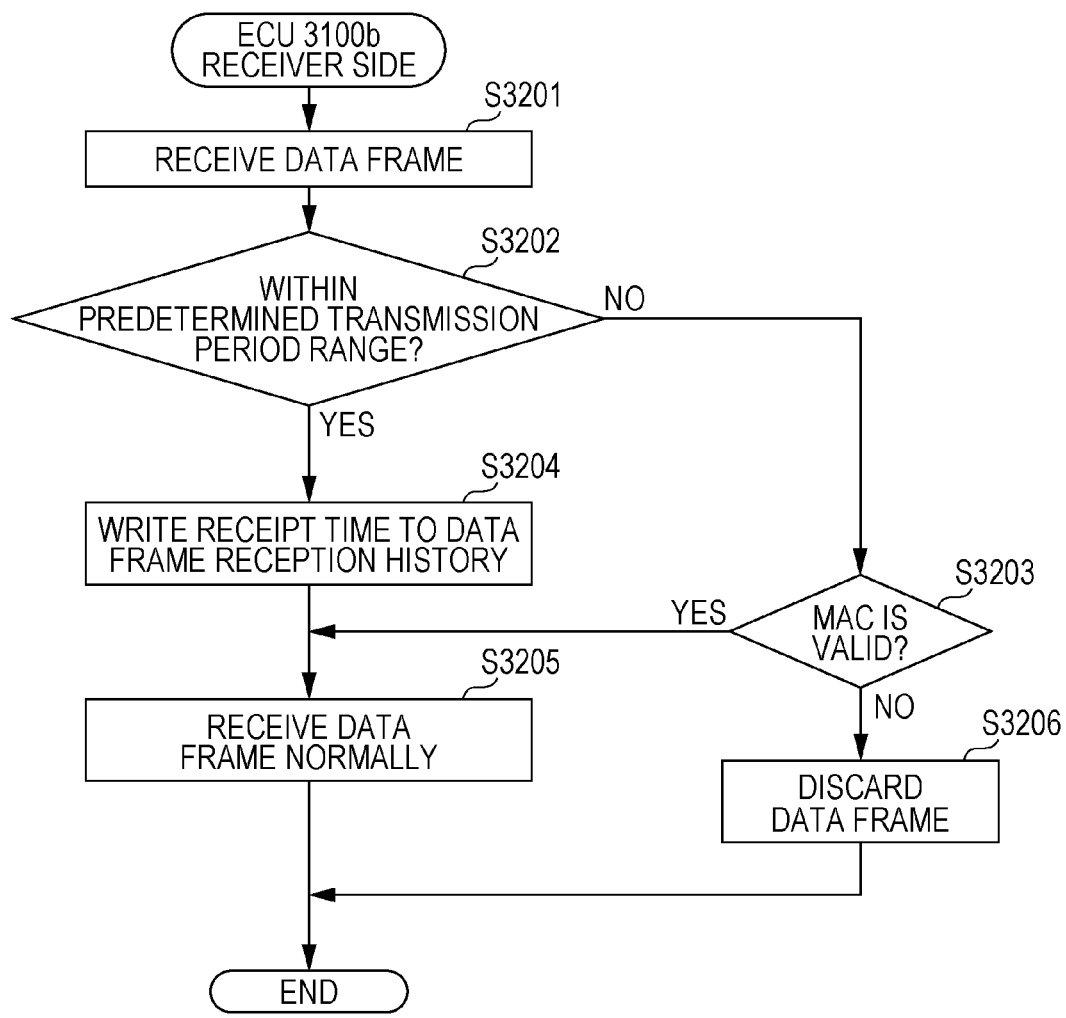
FIG. 24 is a flowchart of a data frame reception process according to the third embodiment.

FIG. 24 is a flowchart of a data frame reception process performed by the ECU 3100b.

The ECU 3100b receives the data frame appearing in the bus 200 (step S3201). Note that if the data frame does not include the message ID to be received by the ECU 3100b itself, the ECU 3100b discards the data frame and completes its processing. However, if the ECU 3100b has received the data frame having a message ID to be received by the ECU 3100b itself, the ECU 3100b determines whether the reception is within a transmission period range defined in the held period rule information (step S3202). Note that the fraudulent data frame determination unit 3104 of the ECU 3100b determines whether the reception interval of the received data frame (i.e., the transmission period) is within a predetermined transmission period range (i.e., the reception period satisfies the transmission period condition defined in the period rule information) using the information acquired by the timer 108, the received data frame period holding unit 3105, and the data frame reception history holding unit 106. That is, the fraudulent data frame determination unit 3104 determines whether the difference between the previous receipt time and the receipt time of the currently received data frame (the reception interval) is greater than or equal to a value obtained by subtracting the margin from the transmission period determined for the message ID of the received data frame and is less than or equal to a value obtained by adding the margin to the transmission period.

If, in step S3202, the reception interval of the data frame is within the transmission period range, the transmission period condition is satisfied. Thus, the ECU 3100b associates the message ID of the received data frame with the receipt time of the data frame and records the receipt time of the data frame in the list held by the data frame reception history holding unit 106 as the previous receipt time (i.e., updates the previous receipt time) (step S3204). After the process in step S3204 is completed, the fraudulent data frame determination unit 3104 of the ECU 3100b determines that the received data frame is an authorized data frame (step S3205), and the data frame processing unit 107 performs a process corresponding to the data frame.

In addition, if, in step S3202, the difference between the previous data frame receipt time and the receipt time of the currently received data frame is not within the transmission period range, the ECU 3100b separates the data field of the data frame into the MAC field I and a data area in accordance with the event-driven data frame format stored in the received data frame period holding unit 3105. Thereafter, the ECU 3100b compares the MAC calculated using the data area and the message ID with the MAC contained in the MAC field and verifies the validity of the data frame (the MAC is valid) (step S3203). If the calculated MAC is the same as the MAC contained in the MAC field, the verification of the MAC (i.e., verification of the validity of the MAC) is successful. Accordingly, the ECU 3100b determines that the received data frame is an authorized data frame (step S3205) and, thus, the data frame processing unit 107 performs a process corresponding to the data frame.

However, if, in step S3203, it is determined that the calculated MAC is not the same as the MAC contained in the MAC field (the verification of MAC is not successful), the ECU 3100b determines that the received data frame is a fraudulent data frame and, thus, discards the data frame (step S3206). Accordingly, the ECU 3100b does not process the fraudulent data frame sent from the fraudulent ECU.

Note that when, in step S3202, it is determined whether the reception interval of the data frame (i.e., the transmission period) is within the predetermined transmission period range and if the previous receipt time is not stored (e.g., at the first time of determination), the received data frame can be considered as an event-driven data frame. Thereafter, when the verification of the MAC is successful, the receipt time of the data frame can be recorded as the previous receipt time. Subsequently, the process in step S3205 can be performed. In such a case, at the start point of periodic transmission, such as the first transmission, the sender ECU exceptionally sends an event-driven data frame. In addition, if there is a duration in which, for example, each of the ECUs enters a sleep mode and stops periodical transmission of a data frame, the data frame may be sent as an event-driven data frame when the periodical transmission resumes. In such a case, if the sender ECU enters a sleep mode and, thus periodical transmission stops for a predetermined period of time since the previous receipt time, the receiver ECU cancels out the previous receipt time. Thereafter, the receiver ECU considers the next time as a first time and considers the received data frame as an event-driven data frame. In this manner, the receiver ECU can determine the validity of the data frame.

In addition, the ECU 3100a can perform a reception process that is similar to the reception process illustrated in FIG. 24.

3.6 Effect of Third Embodiment

According to the third embodiment, the in-vehicle network system 12 is provided. Even when in addition to a periodically sent data frame, an event-driven data frame that is non-periodically sent is present, the in-vehicle network system 12 is capable of determining whether a data frame is an authorized data frame by providing the specific identifier (i.e., MAC) in an event-driven data frame. That is, the in-vehicle network system 12 determines whether a data frame is an authorized data frame using the transmission period condition. Only when it is difficult to determine whether a data frame is an authorized data frame using the transmission period condition, the in-vehicle network system 12 determines (verifies) whether the data frame is an authorized data frame using the specific identifier. In this manner, an authorized event-driven data frame that does not satisfy the transmission period condition is prevented from being misdetected as a fraudulent data frame. In addition, when a fraudulent ECU sends a data frame, it is highly likely that the data frame does not satisfy the transmission period condition and, thus, it is difficult for the fraudulent ECU to correctly provide the MAC. Accordingly, an ECU that has received the data frame can determine that the received data frame is a fraudulent data frame. Note that a data frame that is not an event-driven data frame (i.e., a periodically sent data frame) need not contain MAC in the data field. Accordingly, the entire data field, for example, can be used.

Fourth Embodiment

An in-vehicle network system 13 according to another embodiment of the present disclosure that achieves a fraud detection method for appropriately detecting that a fraudulent data frame is sent between an ECU 4100a and an ECU 4100b that communicate data frames to each other under the condition that a non-periodical event-driven data frame can be sent in addition to a periodically sent data frame is described below with reference to the accompanying drawings. Note that the in-vehicle network system 13 is formed by partially modifying the in-vehicle network system 10 according to the first embodiment and the in-vehicle network system 12 according to the third embodiment. The format of the data field of a data frame used in the in-vehicle network system 13 is the same as that of the third embodiment.

4.1 Overall Configuration of In-Vehicle Network System

Figure 25:
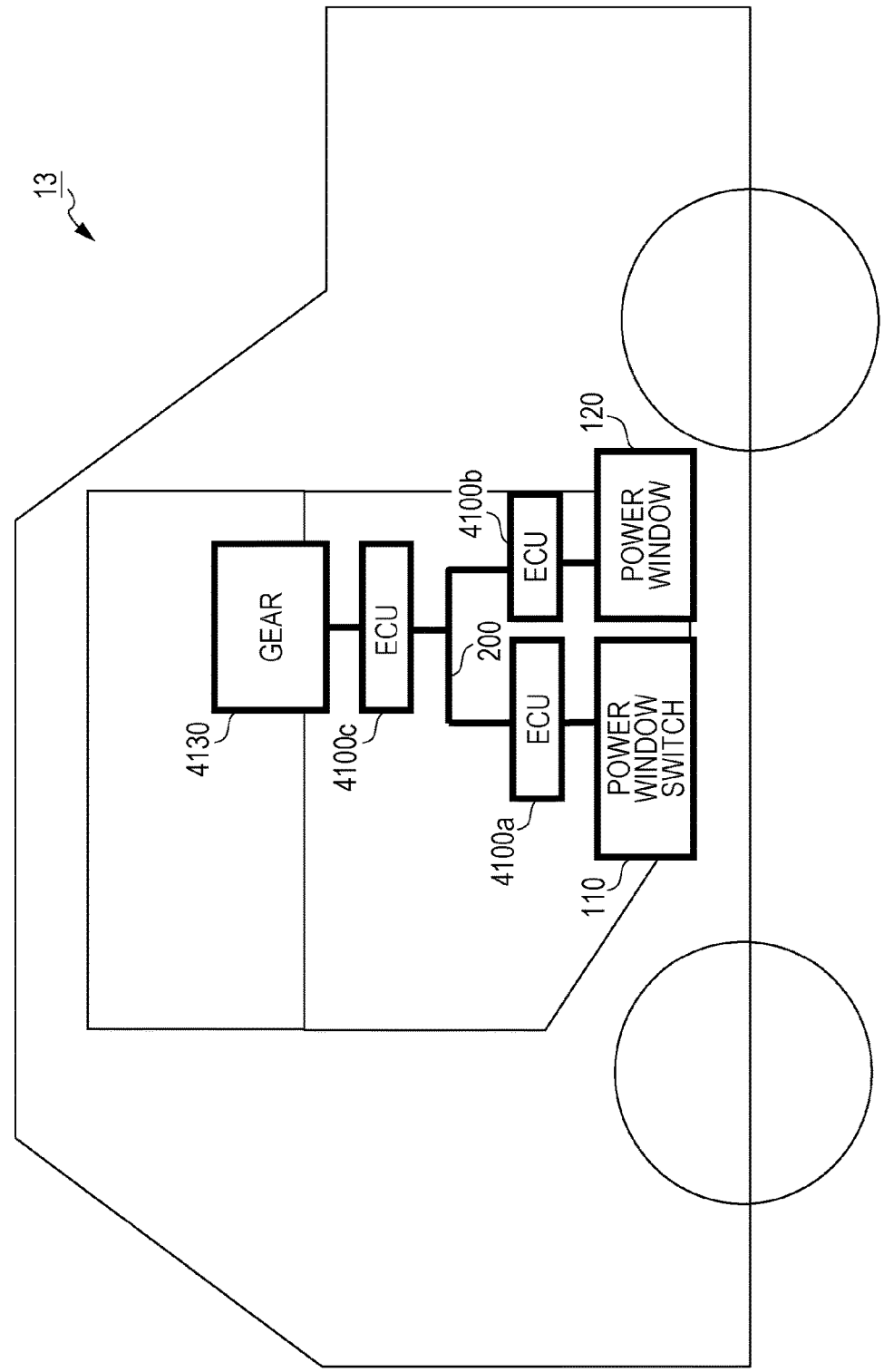
FIG. 25 illustrates the overall configuration of an in-vehicle network system according to a fourth embodiment.

FIG. 25 illustrates the overall configuration of the in-vehicle network system 13 according to a fourth embodiment. The in-vehicle network system 13 is a network communication system of a motor vehicle having a variety of devices, such as a control unit and a sensor mounted therein. The in-vehicle network system 13 includes the ECUs 4100a to 4100c connected to a variety of devices and a bus 200 that connects the ECUs to one another. Among the constituent elements of the in-vehicle network system 13, the constituent element having a function that is the same as that of the above-described in-vehicle network system 10 or other in-vehicle network systems is identified with the same reference numeral, and description of the constituent element is not repeated. The ECU is a device including, for example, digital circuits, such as a processor (a microprocessor) and a memory, analog circuits, and a communication circuit. Hereinafter, description is given under the assumption that a fraudulent ECU that sends a fraudulent data frame may be connected to the bus 200.

The ECU 4100c is connected to a gear 4130. The ECU 4100c determines the state of the vehicle in accordance with the state of the gear 4130 and sends a data frame indicating the state of the vehicle to the bus 200. Examples of the state of the vehicle determined from the gear 4130 include the states of the vehicle that is, for example, driving and parking.

The ECU 4100a is formed by partially modifying the ECU 100a according to the first embodiment. The ECU 4100a is connected to the power window switch 110. The ECU 4100a periodically sends, to the bus 200, a data frame including information indicating the state of the power window switch 110. In addition, if the state of the power window switch 110 varies, the ECU 4100a sends a data frame including the information indicating the state of the power window switch 110 (i.e., the information indicating a sensor value) to the bus 200. Accordingly, in addition to repeatedly sending the data frame at predetermined transmission periods, the ECU 4100a sends a non-periodical event-driven data frame to the bus 200 if the time at which the state of the power window switch 110 varies does not exactly match the transmission period. Furthermore, the ECU 4100a receives a data frame that is sent from the ECU 4100b to the bus 200 and that flows in the bus 200. Thereafter, the ECU 4100a verifies that, for example, the data frame sent from the ECU 4100a has been correctly received. Still furthermore, the ECU 4100a can receive a data frame indicating the state of the vehicle sent from the ECU 4100c and recognize the state of the vehicle.

The ECU 4100b is formed by partially modifying the ECU 100b according to the first embodiment. The ECU 4100b is connected to a power window 120. The ECU 4100b receives a data frame that is sent from the ECU 4100a to the bus 200 and that flows in the bus 200. Thereafter, the ECU 4100b controls the power window 120 so that the power window 120 is open or closed in accordance with the state of the power window switch 110 included in the data frame. In addition, the ECU 4100b periodically sends a data frame in accordance with the open/close control state of the power window 120 to the bus 200. Furthermore, the ECU 4100b receives, from the ECU 4100c, a data frame indicating the state of the vehicle and, thus, can recognize the state of the vehicle. In the in-vehicle network system 13, each of the ECUs sends and receives a frame in accordance with CAN protocol. The ECUs have a function of determining whether the received data frame is a fraudulent data frame.

4.2 Configuration of ECU

Figure 26:
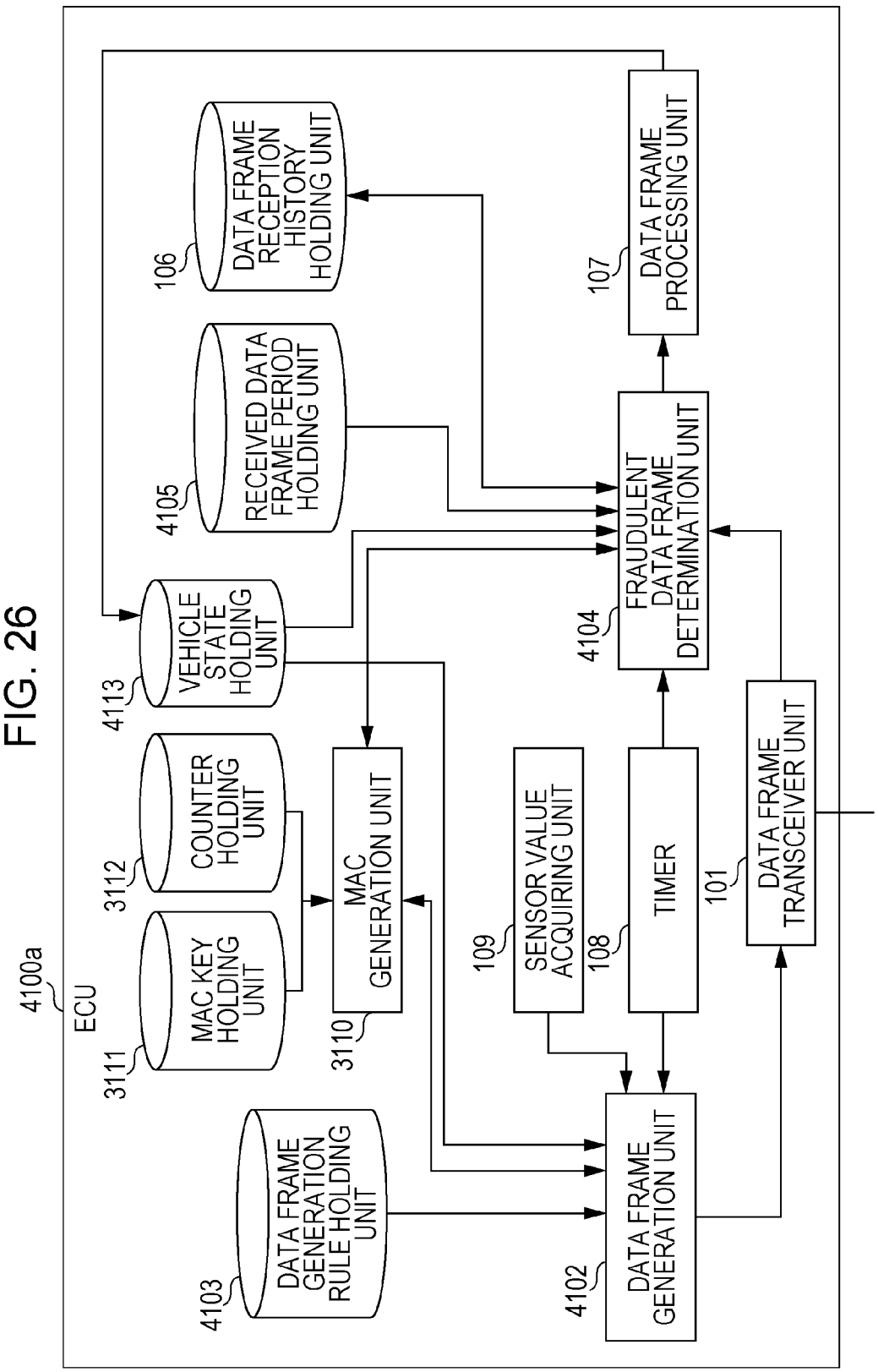
FIG. 26 illustrates the configuration of an ECU according to the fourth embodiment.

FIG. 26 illustrates the configuration of the ECU 4100a. The ECU 4100a includes a data frame transceiver unit 101, a data frame generation unit 4102, the data frame generation rule holding unit 4103, a fraudulent data frame determination unit 4104, a received data frame period holding unit 4105, a data frame reception history holding unit 106, a data frame processing unit 107, a timer 108, a sensor value acquiring unit 109, a MAC generation unit 3110, a MAC key holding unit 3111, and a counter holding unit 3112. Among the constituent elements of the ECU 4100a, the constituent element having a function that is the same as that of the ECU 100a according to the first embodiment or the ECU 3100a according to the third embodiment is identified with the same reference numeral, and description of the constituent element is not repeated. These constituent elements are functional constituent elements. The functions are realized by the communication circuit of the ECU 4100a and one of, for example, the processor that executes the control program stored in the memory and a digital circuit. Note that each of the ECU 4100b and the ECU 4100c has substantially the same configuration as that of the ECU 4100a. However, the information stored in each of the data frame generation rule holding unit 4103, the received data frame period holding unit 4105, and the data frame reception history holding unit 106 may differ on an ECU basis. In addition, the processing performed by the data frame processing unit 107 differs on an ECU basis.

The data frame generation unit 4102 generates a data frame in accordance with data frame generation rules stored in the data frame generation rule holding unit 4103 and sends the generated data frame to the data frame transceiver unit 101. The data frame generation unit 4102 acquires the current time from the timer 108. In addition, the data frame generation unit 4102 acquires, from the sensor value acquiring unit 109, the data regarding a device (the power window switch 110) connected to the ECU 4100a (i.e., the sensor value). To periodically send the data frame from the ECU 4100a, the data frame generation unit 4102 determines the timing at which the data frame is generated using the current time and the transmission period stored in the data frame generation rule holding unit 4103 and periodically generates the data frame. Note that after the data frame is generated by the data frame generation unit 4102, the data frame is sent to the data frame transceiver unit 101. The data frame transceiver unit 101 sends the data frame. In addition, if a point in time at which the sensor value acquired from the sensor value acquiring unit 109 varies differs from the above-described periodical timing, the data frame generation unit 4102 generates an event-driven data frame. To generate the event-driven data frame, the data frame generation unit 4102 determines whether MAC is set in the event-driven data frame on the basis of MAC providing conditions (described in more detail below) of the data frame generation rules for each of the message IDs stored in the data frame generation rule holding unit 4103. If the data frame generation unit 4102 determines that the MAC is set, the data frame generation unit 4102 sets the MAC in the data frame in accordance with the event-driven data frame format. The MAC is the same as that described in the third embodiment. That is, like the data frame generation unit 3102 according to the third embodiment, the data frame generation unit 4102 generates a data frame having a specific identifier called MAC provided therein when sending the data frame at a timing that does not follow the data frame generation rule indicating the transmission period. That is, the data frame generation unit 4102 functions as a providing unit. As a result of generation of the data frame by the data frame generation unit 4102, the data frame is periodically sent from the ECU 3100a to the bus 200 by the data frame transceiver unit 101. In addition, at the start point of periodic transmission, such as the first transmission (e.g., when the engine is started, before the engine is started, or when the ECU 4100a resumes from the sleep mode), the data frame generation unit 4102 sends the data frame in the format of the event-driven data frame. This is because if a periodic data frame is sent at the start point of periodic transmission instead of an event-driven data frame, the receiver ECU cannot make determination based on the transmission period condition. Note that at, for example, the start point of periodic transmission, MAC may be set in the event-driven data frame.

The data frame generation rule holding unit 4103 is formed from a storage medium, such as a memory. The data frame generation rule holding unit 4103 store, as the data frame generation rules, the transmission period used to periodically send a data frame for each of the message IDs sent from the ECU 4100a, the event-driven data frame format indicating, for example, the position at which MAC is stored and the data length, and the MAC providing conditions that determine whether the MAC is provided in the event-driven data frame. The MAC providing conditions further determine in which state of the vehicle the MAC should be provided. FIG. 27 illustrates an example of the data frame generation rules stored in the data frame generation rule holding unit 4103. In this case, the ECU 4100*a* sends a plurality of types of data frame (a type of data frame identified by the message ID), such as the data frame indicating the state of the power window switch 110. In the example in FIG. 27, the transmission period of a data frame that is periodically sent from the ECU 4100*a* and that has a message ID of 0x100 is 50 ms. If the data frame is sent as an event-driven data frame that does not follow the transmission period, MAC needs to be provided only when the vehicle is traveling. In addition, to provide the MAC, the MAC needs to be stored in the least significant 16 bits of the data field. In addition, the transmission period of a data frame having a message ID of 0x200 is 100 ms, and an event-driven data frame having a message ID of 0x200 is not sent. Furthermore, the transmission period of a data frame that is periodically sent from the ECU 4100*a* and that has a message ID of 0x300 is 70 ms. If the data frame is sent as an event-driven data frame that does not follow the transmission period, MAC needs to be provided when the state of the vehicle is traveling or parking. In addition, to provide the MAC, the MAC needs to be stored in the least significant 16 bits of the data field.

The fraudulent data frame determination unit 4104 determines whether the received data frame is an authorized data frame (not a fraudulent data frame). That is, the fraudulent data frame determination unit 4104 refers to the period rule information in the received data frame period holding unit 4105 and verifies whether the data frame satisfies a transmission period condition predetermined for each of the message IDs. If the data frame satisfies the transmission period condition, the fraudulent data frame determination unit 4104 determines that the data frame is a data frame sent from an authorized ECU (i.e., an authorized data frame). In addition, even when the data frame does not satisfy the transmission period condition, the fraudulent data frame determination unit 4104 determines whether the data frame is a fraudulent data frame by verifying whether MAC is contained in the data frame in accordance with the event-driven data frame format if the state of the vehicle stored in a vehicle state holding unit 4113 satisfies a MAC provided event-driven data frame reception condition stored in the received data frame period holding unit 4105. The MAC provided event-driven data frame reception condition determines in which state of the vehicle an event-driven data frame having MAC provided therein should be received. When the state of the vehicle satisfies the MAC provided event-driven data frame reception condition and if the verification of the MAC in the data field is successful, the fraudulent data frame determination unit 4104 determines that the received data frame is an authorized data frame. However, if the verification fails, the fraudulent data frame determination unit 4104 determines that the received data frame is a fraudulent data frame. That is, like the fraudulent data frame determination unit 3104 according to the third embodiment, if a data frame that does not follow the period rule information corresponding to the data frame generation rule indicating the transmission period is received by the data frame transceiver unit 101, the fraudulent data frame determination unit 4104 verifies the specific identifier called MAC in the data frame. That is, the fraudulent data frame determination unit 4104 has a function of a verifying unit. To verify the MAC, the value obtained from the MAC generation unit 3110 by sending the message ID of the data frame and the information in the data area of the data field to the MAC generation unit 3110 is compared with the information in the MAC field I in the data field. If the values are the same, the verification of the MAC is successful. If the received data frame does not satisfy the predetermined transmission period condition and, in addition, the state of the vehicle does not satisfy the MAC provided event-driven data frame reception condition, the fraudulent data frame determination unit 4104 determines that the event-driven data frame is the authorized data frame without verifying the MAC. That is, if the state of the vehicle satisfies the MAC provided event-driven data frame reception condition for the event-driven data frame, the fraudulent data frame determination unit 4104 verifies the MAC. Otherwise, the fraudulent data frame determination unit 4104 does not perform the verification. However, if in, for example, the first periodical transmission, the sender sets MAC in the event-driven data frame, the corresponding MAC verification can be performed by the receiver. Note that upon receiving a data frame that satisfies the transmission period condition, the fraudulent data frame determination unit 4104 stores the receipt time in the data frame reception history holding unit 106 as the previous receipt time. If it is determined that the received data frame is an authorized data frame, the fraudulent data frame determination unit 4104 causes the data frame processing unit 107 to process the data frame. However, if it is determined that the received data frame is a fraudulent data frame, the fraudulent data frame determination unit 4104 discards the data frame (i.e., inhibits the data frame processing unit 107 from processing the data frame).

The received data frame period holding unit 4105 is formed from a storage medium, such as a memory. The received data frame period holding unit 4105 stores the period rule information. The period rule information indicates a correspondence between a predetermined transmission period for each of the message IDs of the data frames received by the ECU 4100*a* itself and a margin indicating an allowable range used for the data frame reception period to be determined to satisfy the transmission period condition (that is, to be the same as the valid transmission period). In addition, the period rule information includes an event-driven data frame format that indicates, for example, the position at which the MAC is stored in the data field of the event-driven data frame and the length of data and the MAC provided event-driven data frame reception condition. The event-driven data frame format is used by the fraudulent data frame determination unit 4104 to verify the validity of the event-driven data frame (i.e., verify the MAC). Furthermore, the MAC provided event-driven data frame reception condition is a condition related to the state of the vehicle and indicates in which state of the vehicle MAC should be verified for the event-driven data frame. Note that the transmission period in the period rule information held by the received data frame period holding unit 4105 of an ECU on a data frame receiver side corresponds to the transmission period in the data frame generation rules held by the data frame generation rule holding unit 4103 of an ECU on the data frame sender side. In addition, the event-driven data frame format in the period rule information held by the received data frame period holding unit 4105 of an ECU on a data frame receiver side corresponds to the event-driven data frame format in the data frame generation rules held by the data frame generation rule holding unit 4103 of an ECU on the data frame sender side. Furthermore, the MAC provided event-driven data frame reception condition in the period rule information held by the received data frame period holding unit 4105 on the data frame receiver side corresponds to the MAC providing conditions in the data frame generation rules held by the data frame generation rule holding unit 4103 of the ECU on a data frame sender side. FIG. 28 illustrates an example of the period rule information stored in the received data frame period holding unit 4105 of the ECU 4100b that receives a data frame sent from the ECU 4100a. In an example in FIG. 28, the transmission period of the data frame having a message ID of 0x100 is 50 ms. The transmission period of the data frame having a message ID of 0x200 is 100 ms, and the transmission period of the data frame having a message ID of 0x300 is 70 ms. In the example illustrated in FIG. 28, the margin is 1 ms for all the message IDs. Since the margin is 1 ms, the fraudulent data frame determination unit 4104 of the ECU 4100b determines that the transmission period condition is satisfied if the transmission period for the data frame having a message ID of 0x100 is in the range between 49 ms and 51 ms (inclusive). In addition, in the example illustrated in FIG. 28, the event-driven data frame format indicates that the event-driven data frame having a message ID of each of 0x100 and 0x300 has MAC provided in the least significant 16 bits of the data field. Also, the event-driven data frame format indicates that the event-driven data frame having a message ID of 0x200 is not sent. Furthermore, in the example illustrated in FIG. 28, the MAC provided event-driven data frame reception condition indicates that the MAC of the event-driven data frame having a message ID of 0x100 needs to be verified when the state of the vehicle is "traveling" and indicates that the MAC of the event-driven data frame having a message ID of 0x200 need not be verified since the event-driven data frame is not sent. In addition, the MAC provided event-driven data frame reception condition indicates that the MAC of the event-driven data frame having a message ID of 0x300 needs to be verified when the state of the vehicle is "traveling" or "parking".

Figure 29:
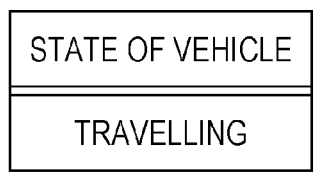
FIG. 29 illustrates an example of the state of a vehicle held in a vehicle state holding unit according to the fourth embodiment.

The vehicle state holding unit 4113 is formed from a storage medium, such as a memory. The vehicle state holding unit 4113 stores the value indicating the state of the vehicle. FIG. 29 illustrates an example of the state of the vehicle stored in the vehicle state holding unit 4113. In this example, the state of the vehicle indicates "traveling". When the data frame sent from the ECU 4100c (the data frame indicating the state of the vehicle) is received and if it is determined that the data frame is an authorized data frame, the state of the vehicle held in the vehicle state holding unit 4113 is stored (updated) by the data frame processing unit 107 in accordance with the information in the data frame.

4.3 Data Frame Transmission Process Performed by ECU

The data frame transmission process performed by the ECU 4100a under the assumption that the ECU 4100a sends a data frame to the bus 200 and the ECU 4100b receives the data frame from the bus 200 is described below.

Figure 30:
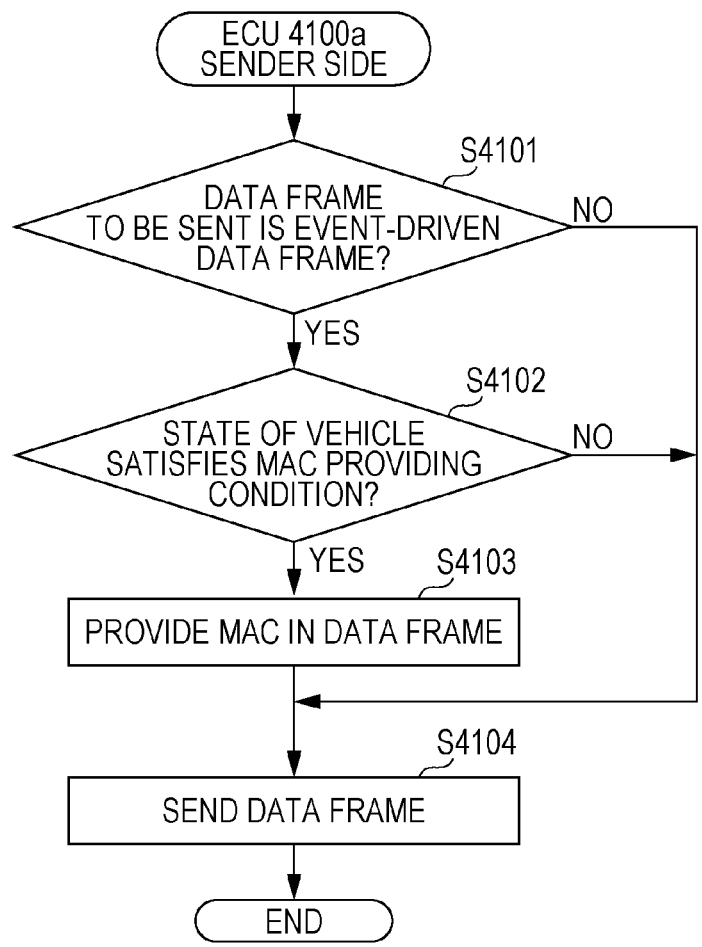
FIG. 30 is a flowchart of a data frame transmission process according to the fourth embodiment.

FIG. 30 is a flowchart of a data frame transmission process performed by the ECU 4100a.

The ECU 4100a needs to generate a data frame at a transmission timing in accordance with the transmission period defined in the data frame generation rules (a timing at which the transmission period has elapsed since the previous transmission) or at a timing at which the sensor value from the sensor value acquiring unit 109 varies. Thus, the ECU 4100a starts the transmission process illustrated in FIG. 30. In the transmission process, the ECU 4100a determines whether the data frame to be sent is an event-driven data frame or a periodical data frame first (step S4101).

If, in step S4101, the ECU 4100a determines that the data frame to be sent is an event-driven data frame that does not follow the transmission period defined in the data frame generation rules, the ECU 4100a determines whether the state of the vehicle stored in the vehicle state holding unit 4113 in accordance with the data frame received from the ECU 4100c satisfies the MAC providing conditions in the data frame generation rules (step S4102). For example, when the MAC providing conditions indicates "traveling" or "parked" and if the state of the vehicle indicated by the data frame from the ECU 4100a (the state of the vehicle in the vehicle state holding unit 4113) indicates "traveling", the vehicle state holding unit 4113 determines that the state of the vehicle satisfies the MAC providing conditions.

If, in step S4102, the ECU 4100a determines that the state of the vehicle satisfies the MAC providing conditions, the ECU 4100a provides MAC in the MAC field I of the data field of the generated data frame in accordance with the event-driven data frame format in the data frame generation rules (step S4103).

If, in step S4101, the ECU 4100a determines that the data frame to be sent is a periodical data frame that follows the transmission period defined in the data frame generation rules (i.e., not an event-driven data frame), the ECU 4100a skips the processes in steps S4102 and S4103. In addition, if, in step S4102, the ECU 4100a determines that the state of the vehicle does not satisfy the MAC providing conditions, the ECU 4100a skips the process in step S4103.

After the ECU 4100a has completed the process in step S4103 or has skipped the process in step S4103, the ECU 4100a sets the latest sensor value acquired from the sensor value acquiring unit 109 in the data area of the data field to generate the data frame to be sent. Thereafter, the ECU 4100a sends the generated data frame to the bus 200 (step S4104). In this manner, the data frame flows in the bus 200 and can be received by the ECU 4100b.

Note that the ECU 4100b can perform a transmission process that is similar to the transmission process illustrated in FIG. 30.

4.4 Data Frame Reception Process Performed by ECU

The data frame reception process performed by the ECU 4100b under the assumption that the ECU 4100a sends a data frame to the bus 200 and the ECU 4100b receives the data frame from the bus 200 is described below.

Figure 31:
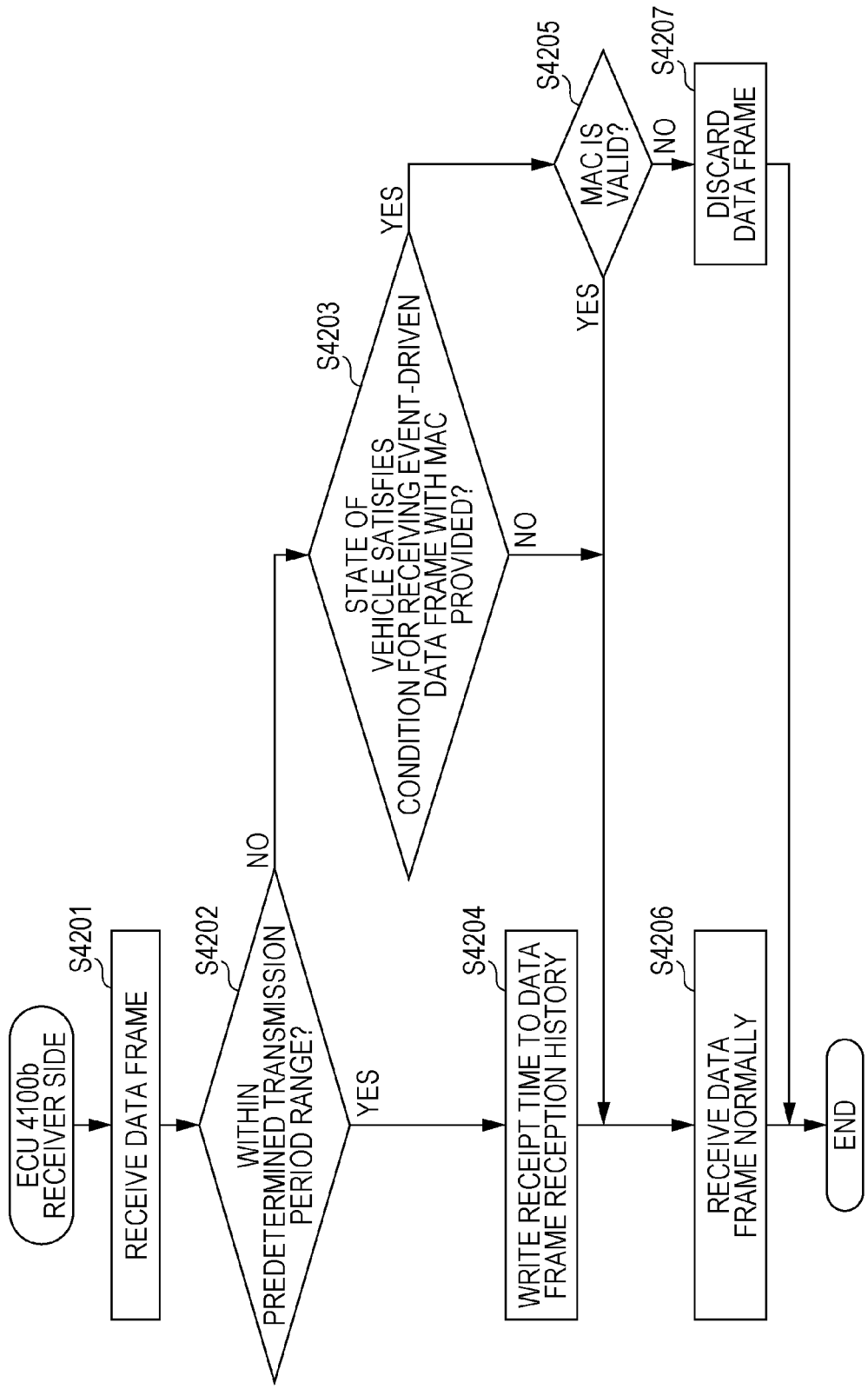
FIG. 31 is a flowchart of a data frame reception process according to the fourth embodiment.

FIG. 31 is a flowchart of the data frame reception process performed by the ECU 4100b.

The ECU 4100b receives the data frame appearing in the bus 200 (step S4201). Note that if the data frame does not include the message ID to be received by ECU 4100b itself, the ECU 4100b discards the data frame and completes its processing. However, if the ECU 4100b has received the data frame having a message ID to be received by the ECU 4100b itself, the ECU 4100b determines whether the reception is within a transmission period range defined in the held period rule information (step S4202). Note that the fraudulent data frame determination unit 4104 of the ECU 4100b determines whether the reception period of the received data frame (i.e., the transmission period) is within a predetermined transmission period range (i.e., the reception period satisfies the transmission period condition defined in the period rule information) using the information acquired by the timer 108, the received data frame period holding unit 4105, and the data frame reception history holding unit 106. That is, the fraudulent data frame determination unit 4104 determines whether the difference between the previous receipt time and the receipt time of the currently received data frame (the reception interval) is greater than or equal to a value obtained by subtracting the margin from the transmission period determined for the message ID of the received data frame and is less than or equal to a value obtained by adding the margin to the transmission period.

If, in step S4202, the reception interval of the data frame is within the transmission period range, the transmission period condition is satisfied. Thus, the ECU 4100b associates the message ID of the received data frame with the receipt time of the data frame and records the receipt time of the data frame in the list held by the data frame reception history holding unit 106 as the previous receipt time (i.e., updates the previous receipt time) (step S4204). After the process in step S4204 is completed, the fraudulent data frame determination unit 4104 of the ECU 4100b determines that the received data frame is an authorized data frame (step S4206), and the data frame processing unit 107 performs a process corresponding to the data frame.

In addition, if, in step S4202, the difference between the previous data frame receipt time and the receipt time of the currently received data frame is not within the transmission period range, the ECU 4100b determines whether the state of the vehicle satisfies the MAC provided event-driven data frame reception condition (step S4203). That is, the ECU 4100b determines whether the state of the vehicle stored in the vehicle state holding unit 4113 in accordance with the data frame received from the ECU 4100c satisfies the MAC provided event-driven data frame reception condition.

If, in step S4203, it is determined that the state of the vehicle satisfies the MAC provided event-driven data frame reception condition, the ECU 4100b separates the data field of the data frame into the MAC field I and a data area in accordance with the event-driven data frame format stored in the received data frame period holding unit 4105. Thereafter, the ECU 4100b compares the MAC calculated using the data area and the message ID with the MAC contained in the MAC field and verifies the validity of the data frame (the MAC is valid) (step S4205). If the calculated MAC is the same as the MAC contained in the MAC field, the verification of the MAC (i.e., verification of the validity of the MAC) is successful. Accordingly, the ECU 4100b determines that the received data frame is an authorized data frame (step S4206) and, thus, the data frame processing unit 107 performs a process corresponding to the data frame.

However, if, in step S4205, it is determined that the calculated MAC is not the same as the MAC contained in the MAC field (the verification of MAC is not successful), the ECU 4100b determines that the received data frame is a fraudulent data frame and, thus, discards the data frame (step S4207). Accordingly, the ECU 4100b does not process the fraudulent data frame sent from the fraudulent ECU.

However, if, in step S4203, it is determined that the state of the vehicle does not satisfy the MAC provided event-driven data frame reception condition, the ECU 4100b determines that the received data frame is an authorized data frame (step S4206). Accordingly, the data frame processing unit 107 performs a process corresponding to the data frame.

Note that when, in step S4202, it is determined whether the reception interval of the data frame (i.e., the transmission period) is within the predetermined transmission period range and if the previous receipt time is not stored (e.g., at the first time of determination), the received data frame can be considered as an event-driven data frame. Thereafter, when the verification of the MAC is successful, the receipt time of the data frame can be recorded as the previous receipt time. Subsequently, the process in step S4206 can be performed. In such a case, at the start point of periodic transmission, such as the first transmission, the sender ECU exceptionally sends an event-driven data frame having MAC provided therein. In addition, if there is a duration in which, for example, each of the ECUs enters a sleep mode and stops periodical transmission of a data frame, the data frame may be sent as an event-driven data frame when the periodical transmission resumes. In such a case, if the sender ECU enters a sleep mode and, thus periodical transmission stops for a predetermined period of time since the previous receipt time, the receiver ECU cancels out the previous receipt time. Thereafter, the receiver ECU considers the next time as a first time and considers the received data frame as an event-driven data frame. In this manner, the receiver ECU can determine the validity of the data frame.

Note that the ECU 4100a can perform a reception process that is similar to the reception process illustrated in FIG. 31.

4.5 Transmission Process of Data Frame Indicating State of Vehicle Performed by ECU A transmission process in which the ECU 4100c acquires the state of the vehicle and sends a data frame indicating the state of the vehicle to the bus 200 is described below.

Figure 32:
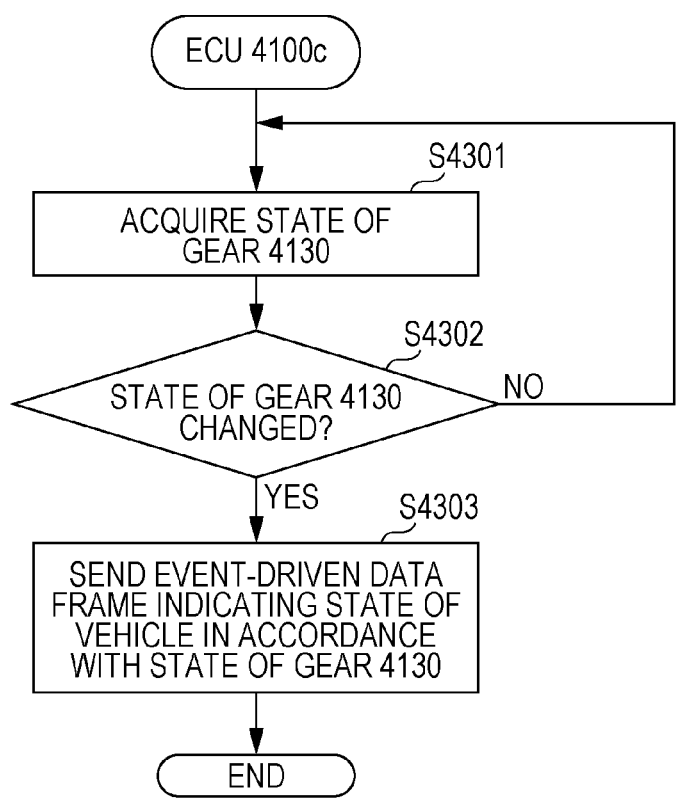
FIG. 32 is a flowchart of a transmission process of a data frame indicating the state of a vehicle according to the fourth embodiment.

FIG. 32 is a flowchart of the transmission process of a data frame indicating the state of the vehicle performed by ECU 4100c. The process illustrated in FIG. 32 is repeatedly performed by the ECU 4100c.

The ECU 4100c acquires the state of the gear 4130 connected thereto from the sensor (step S4301).

The ECU 4100c determines whether the acquired state of the gear 4130 is the state changed from the previously acquired state (step S4302). If the state of the gear 4130 has been changed, the ECU 4100c identifies the state of the vehicle on the basis of a correspondence between a predetermined state of the gear 4130 (e.g., the gear position, such as the first gear, the second gear, or parking) and the state of the vehicle (e.g., travelling or parked) and generates a data frame having the state of the vehicle as the information in the data field. Thereafter, the ECU 4100c sends the generated data frame to the bus 200 as an event-driven data frame (step S4303).

Note that the ECU 4100c may provide MAC in the event-driven data frame and send the event-driven data frame. In such a case, each of the ECU 4100a and the ECU 4100b verifies the MAC in the event-driven data frame received from the bus 200. Only when the verification is successful, each of the ECU 4100a and the ECU 4100b acquires the state of the vehicle and stores the state of the vehicle in the vehicle state holding unit 4113.

4.6 Modification of Data Frame Reception Process Performed by ECU

In the above-described data frame reception process (refer to FIG. 31), if, in step S4203, the state of the vehicle does not satisfy the MAC provided event-driven data frame reception condition, the received data frame is determined to be valid. However, modification may be made so that if the state of the vehicle does not satisfy the MAC provided event-driven data frame reception condition, the received data frame is determined to be a fraudulent data frame and, thus, is discarded. The modification of the reception process is described below.

Figure 33:
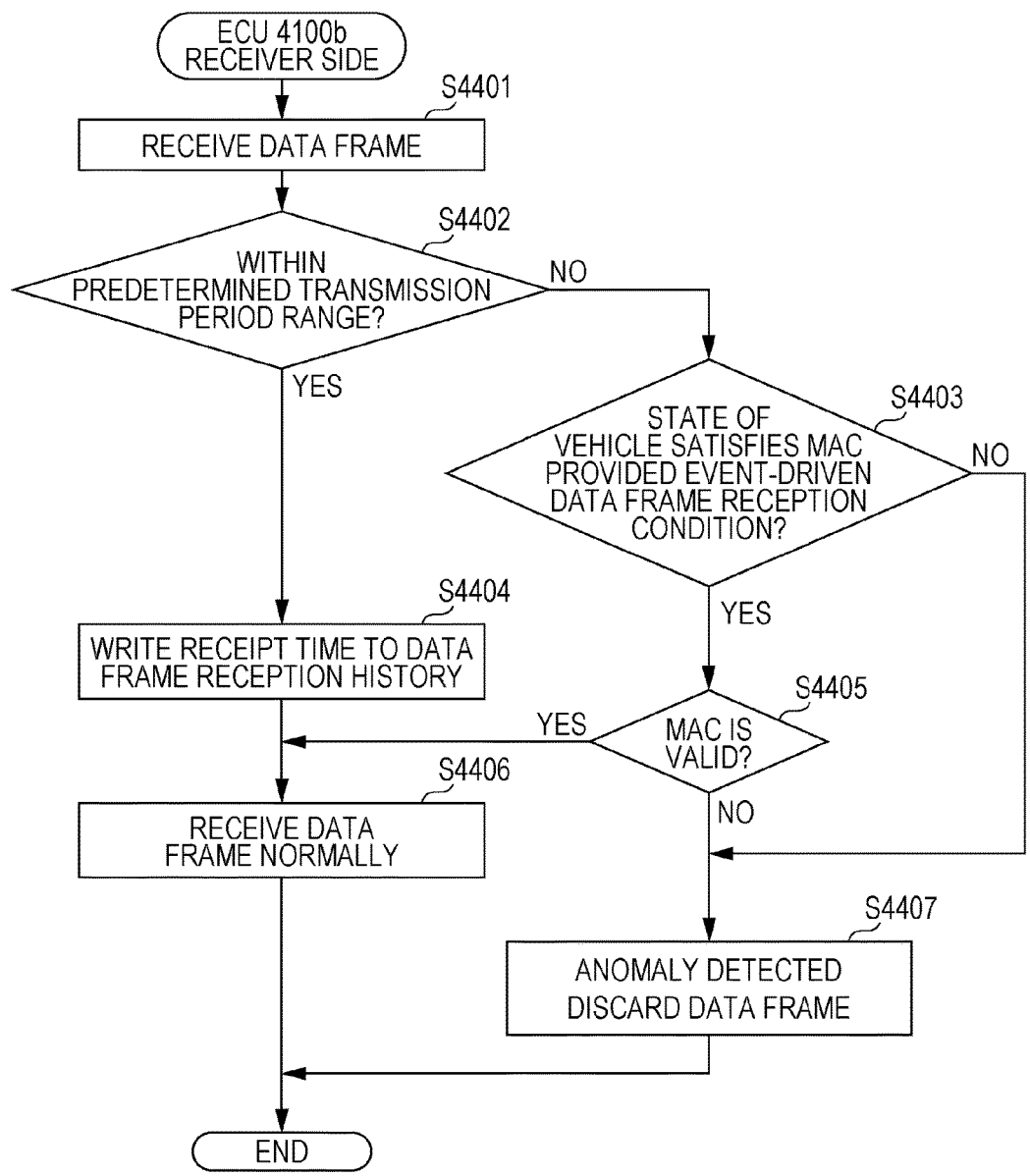
FIG. 33 is a flowchart of a data frame reception process according to a modification of the fourth embodiment.

FIG. 33 is a flowchart of the modification of the data frame reception process performed by the ECU 4100b.

The ECU 4100b receives a data frame appearing in the bus 200 (step S4401). If the ECU 4100b receives a data frame having the message ID to be received by ECU 4100b itself, the ECU 4100b determines whether the reception is within a transmission period range defined in the held period rule information (step S4402). If, in step S4402, the reception interval of the data frame is within a predetermined transmission period range, the ECU 4100b associates the message ID of the received data frame with the receipt time of the data frame and records the receipt time of the data frame in the list held by the data frame reception history holding unit 106 as the previous receipt time (step S4404). After the process in step S4404 is completed, the fraudulent data frame determination unit 4104 of the ECU 4100b determines that the received data frame is an authorized data frame (step S4406), and the data frame processing unit 107 performs a process corresponding to the data frame.

However, if, in step S4402, it is determined that the reception of the data frame is not within the defined transmission period range, the ECU 4100b determines whether the state of the vehicle satisfies the MAC provided event-driven data frame reception condition (step S4403).

If, in step S4403, the ECU 4100b determines that the state of the vehicle satisfies the MAC provided event-driven data frame reception condition, the ECU 4100b compares the MAC calculated using the data area and the message ID with the MAC contained in the MAC field on the basis of the event-driven data frame format stored in the received data frame period holding unit 4105 and verifies the validity of the data frame (the MAC is valid) (step S4405). If the MAC is verified as being valid, the ECU 4100b determines that the received data frame is an authorized data frame (step S4406) and, thus, the data frame processing unit 107 performs a process corresponding to the data frame.

However, if, in step S4403, it is determined that the state of the vehicle does not satisfy the MAC provided event-driven data frame reception condition and the verification of the validity of the MAC is unsuccessful in step S4405, the ECU 4100b determines that the received data frame is a fraudulent data frame and, thus, discards the data frame (step S4407). Accordingly, the ECU 4100b does not process the fraudulent data frame sent from the fraudulent ECU.

4.7 Effect of Fourth Embodiment

According to the fourth embodiment, the in-vehicle network system 13 is provided. Even when in addition to a periodically sent data frame, an event-driven data frame that is non-periodically sent is present, the in-vehicle network system 13 is capable of determining whether a data frame is an authorized data frame by providing the specific identifier (i.e., MAC) in the event-driven data frame. That is, the in-vehicle network system 13 determines whether a data frame is an authorized data frame using the transmission period condition. Only when it is difficult to determine whether a data frame is an authorized data frame using the transmission period condition, the in-vehicle network system 13 determines (verifies) whether the data frame is an authorized data frame using the specific identifier. In this manner, an authorized event-driven data frame that does not satisfy the transmission period condition is prevented from being misdetected as a fraudulent data frame. In addition, when a fraudulent ECU sends a data frame, it is highly likely that the data frame does not satisfy the transmission period condition and, thus, it is difficult for the fraudulent ECU to correctly provide the MAC. Accordingly, an ECU that has received the data frame can determine that the received data frame is a fraudulent data frame. In addition, by switching whether to provide and verify MAC in accordance with the state of the vehicle, the fraudulent data frame can be efficiently detected.

Other Embodiments

While the technology of the present disclosure has been described with reference to the first to fourth embodiments, the technology of the present disclosure is not limited thereto. The technology of the present disclosure is applicable to other embodiment obtained by making any changes, replacement, addition, and removal to the first to fourth embodiments as needed. For example, the following modifications are encompassed within the embodiments of the present disclosure.

(1) In the above-described embodiments, an ECU that sends an event-driven data frame provides, in the event-driven data frame, the specific identifier, such as the event-driven identification flag, the event counter, or MAC that is a resultant value of predetermined calculation, and an ECU that receives the event-driven data frame verifies the specific identifier. However, the specific identifier may be information having a format other than the above-described formats. To verify the specific identifier, the following procedure, for example, may be performed. That is, it is determined whether the value of data having a predetermined length and located at a predetermined position in the data frame is the same as a fixed value or a value derived through predetermined calculation. If the values are the same, the verification is successful. However, if the values are not the same, the verification fails. Note that in the above-described embodiments, after the ECU that receives the data frame determines that the data frame is an event-driven data frame that does not follow the transmission period rules (conditions), the ECU verifies the specific identifier. However, the ECU may verify the specific identifier in the data frame before verifying whether the data frame follows the transmission period rules or at the same time as the verification.

(2) In the above-described embodiments, MAC is generated (calculated) through calculation based on the message ID, the data value, and the counter value. However, MAC can be generated by using part of the information in the data frame (i.e., on the basis of partial information). Alternatively, MAC may be generated using only the data value. Still alternatively, MAC may be generated using only the counter value. The method for verifying MAC employed by the ECU that receives a data frame may be an any method if an ECU that sends the data frame supports a technique of providing MAC in the data frame. In addition, a data frame in which MAC is provided may include some or all of the counter values in the data field in addition to the data value and the MAC. Furthermore, in the above-described embodiments, HMAC is employed as the algorithm used to calculate MAC. Instead of HMAC, CBCMAC (Cipher Block Chaining Message Authentication Code) or CMAC (Cipher-based MAC) may be employed. In addition, any padding method that requires calculation of the data size of a block, such as zero padding, ISO10126, PKCS #1, PKCS #5, or PKCS #7, may be employed as the padding method used to calculate MAC.

(3) In the above-described embodiments, description has been given with reference to two states of the vehicle, that is, "traveling" and "parking". However, the states "stopping", "traveling at high speed", "traveling at low speed", "reversing", and "engine stop" may be distinguished, and the states of the vehicle serving as the condition under which MAC should be provided in an event-driven data frame and the provided MAC should be verified may be defined among the states of the vehicle. For example, it is effective to define the states of the vehicle serving as the conditions under which MAC should be provided and verified so as to correspond to the timing at which the needs for detecting a fraudulent data frame sent to the bus by a fraudulent ECU is relatively high. In addition, the state of the vehicle need not be determined on the basis of the state of the gear 4130 at all times. The state of the vehicle may be determined by sending a data frame including, for example, the sensor value acquired from any device from any one of the ECUs in the vehicle and receiving the data frame using another ECU. For example, by communicating a data frame including the information regarding the travel speed among the ECUs, each of the ECUs that has received the data frame may determine that the state of the vehicle indicates traveling at high speed on the basis of the data frame. Accordingly, for example, the ECU 4100c that sends a data frame indicating the state of the vehicle need not be connected to the gear 4130. Under the assumption that each of the ECUs makes the determination on the basis of the received data frame in a similar manner, if one of the ECUs provides MAC in the data frame when the state of the vehicle requires MAC and sends the data frame, a receiver ECU can recognize that verification of the MAC is required on the basis of the state of the vehicle and verify the MAC.

(4) In the above-described embodiments, the description has been made with reference to the event-driven identification flag, the event counter, or the MAC serving as the specific identifier for identifying an event-driven data frame, at least two of the event-driven identification flag, the event counter, and the MAC may be combined and be used. For example, an ECU that has received a data frame may determine whether the data frame is an event-driven data frame using the event-driven identification flag and, thereafter, verify the validity of the data frame using the MAC. Note that the specific identifier may be provided in a data frame that is not an event-driven data frame. However, the specific identifier need not be provided.

(5) In the above-described embodiments, each of the ECUs sends a data frame. However, the in-vehicle network system may include an ECU that only receives a data frame without sending any data frame. Conversely, the in-vehicle network system may include an ECU that only sends a data frame without receiving any data frame. In addition, each of the ECUs need not send a periodically sent data frame. The in-vehicle network system may include an ECU that sends only an event-driven data frame.

(6) While the above embodiments have been described with reference to the configuration in which an ECU is connected to a power window switch or a power window, an ECU may be connected to another device instead of the power window switch or the power window. Thus, the ECU may control the device and acquire, for example, the state of the device from the device.

(7) While the above embodiments have been described with reference to the ECU that discards the data frame if the ECU detects that the data frame is a fraudulent data frame, the ECU need not discard the data frame. Instead, for example, if the ECU detects a fraudulent data frame, the ECU may send a data frame indicating detection of fraud. In addition, the ECU may set, for example, the information regarding the fraudulent data frame in the data frame to be sent. Furthermore, if the ECU detects a fraudulent data frame, the detection may be recorded as a log or may change the operation mode of the vehicle to a mode that further increases the safety of the vehicle.

(8) While the above embodiments have been described with reference to a transmission counter or a reception counter for each of ECUs incremented by one each time the event-driven data frame is transmitted or received, the calculation of the counter value is not limited to one increment. Any counter value calculation that is the same for the data frame sender ECU and the data frame receiver ECU and is synchronized between the data frame sender ECU and the data frame receiver ECU can be employed. For example, calculation using the previous calculation result as an input value and providing an output value identified on the basis of a predetermined algorithm can be employed. That is, the ECU may set, in the subsequently sent event-driven data frame as a specific identifier, a value obtained through predetermined calculation made on the basis of the specific identifier, such as a counter provided in the previously sent event-driven data frame (i.e., the result of the previous calculation).

(9) The data frame generation rules and the period rule information described in the above embodiments are only examples. The values may be changed from the values in the above embodiments. In addition, the data frame generation rules and the period rule information may be set when the ECUs are shipped or the vehicle body having the in-vehicle network system installed therein is shipped. In addition, the data frame generation rules and the period rule information may be set on the basis of communication with the outside or using one of a variety of recording media or one of some tools.

(10) While the above embodiments have been described with reference to the example in which all the ECUs have a function of detecting a fraudulent data frame, only at least one particular ECU may have the function. For example, when the in-vehicle network system is formed from ECU groups each connected to one of a plurality of buses, only ECUs serving as gateways that connect one bus to another bus may have the function of detecting a fraudulent data frame. Alternatively, for example, if the in-vehicle network system includes a display unit, such as a liquid crystal display (LCD), that is provided on the instrument panel of the vehicle and that displays visual information for the driver and a head unit serving as an ECU including input means that receives the operation performed by the driver, only the head unit may have the function of detecting a fraudulent data frame. Still alternatively, the in-vehicle network system may include at least one particular ECU that has the function of detecting a fraudulent data frame. If the ECU monitors the bus and detects a fraudulent data frame, the ECU may send a data frame indicating that a fraudulent data frame is detected.

(11) While the above embodiments have been described with reference to the example in which the MAC key is held for each of the message IDs, the MAC key may be held for each of the ECUs. Note that all the ECUs need not hold the same MAC key. Also note that the ECUs connected to the same bus may hold a common MAC key.

(12) While the above embodiments have been described with reference to a transmission counter or a reception counter held for each of the message IDs of the transmitted or received data frame, a transmission counter or a reception counter may be held for a plurality of the message IDs. In addition, the same counter may be used for all the data frames flowing in the same bus.

(13) The fraudulent data frame determination unit according to the above-described embodiments may be implemented in the hardware called a CAN controller or the firmware running in a microcomputer that is connected to a CAN controller. In addition, the MAC key holding unit, the counter holding unit, the received data frame period holding unit, and the data frame reception history holding unit may be stored in a register of the hardware called a CAN controller or the firmware running in a microcomputer that is connected to a CAN controller.

(14) While the above embodiments have been described with reference to the data frame of the CAN protocol written in the standard ID format, the data frame may be written in the extended ID format. The extended ID format has 29 bits made up of a base ID located at the ID position in the standard ID format and an extended ID. This 29-bit ID can be regarded as the ID (the message ID) used in the processes according to the above-described embodiments.

(15) The CAN protocol according to the above-described embodiments may be a CAN protocol that adopts a broad definition including a derivative protocol, such as Time-Triggered CAN (TTCAN) or CAN with Flexible Data Rate (CANFD).

(16) While the above embodiments have been described with reference to the ECUs each being a device including, for example, a digital circuit (e.g., a processor and a memory), an analog circuit, and a communication circuit, the ECU may include other hardware constituent elements, such as a hard disk unit, a display, a keyboard, and a mouse. Alternatively, the function may be realized by dedicated hardware (e.g., a digital circuit) instead of being realized by software, that is, a control program stored in a memory and executed by a processor.

(17) Some or all of the constituent elements that constitute each of the units of the above-described embodiments (e.g., the ECU) may be formed from a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI realizes the function. Alternatively, the units of the constituent element that constitutes each of the above-described devices may be individually formed as one chip, or the one chip may be formed so as to include some or all of the units. Note that although the term "the system LSI" is used, the system LSI may be referred to as an "IC", an "LSI", a "super LSI", or an "ultra LSI" depending on the integration degree. The method for integrating the units is not limited to making an LSI. The method for integrating the units may be realized by a dedicated circuit or a general-purpose processor. Alternatively, an FPGA (Field Programmable Gate Array) that is programmable after the LSI is produced or a reconfigurable processor that allows the circuit cells in the LSI to be re-connected and allows the settings to be reconfigured may be employed. Still alternatively, if a new technology that replaces an LSI is developed with the advancement of semiconductor technology or another related technology, the functional blocks may be integrated by using such a technology. Note that there is a possibility of applying biotechnology.

(18) Some or all of the constituent elements that constitute each of the above-described units may be formed from an IC card or a single module removable from the device. The IC card or the module is a computer system formed from, for example, a microprocessor, a ROM, and a RAM. The IC card or the module may include the above-described super multifunctional LSI. When the microprocessor operates in accordance with the computer program, the IC card or the module provides its function. The IC card or the module may be tamper resistant.

(19) According to an aspect of the present disclosure, the above-described fraud detection method may be provided. The method may be represented by a computer program realized by a computer or a digital signal formed from the computer program. According to another aspect of the present disclosure, the computer program or the digital signal recorded in a computer-readable storage medium, such as a flexible disk, a hard disk, a CD-ROM, an MO, a DVD, a DVD-ROM, a DVD-RAM, a BD (Blu-ray (trade name) Disc), or a semiconductor memory, is provided. In addition, the above-described digital signal recorded in such a storage medium may be provided. According to another aspect of the present disclosure, the computer program or the digital signal may be transmitted via an electric communication network, a wireless or wired communication network, a network represented by the Internet, or data broadcasting. According to another aspect of the present disclosure, a computer system including a microprocessor and a memory is provided. The memory may store the computer program therein, and the microprocessor may operate in accordance with the computer program. Furthermore, the present disclosure may be realized by another independent computer system by recording the program or the digital signal in the storage medium and transferring the storage medium or transferring the program or the digital signal via, for example, the above-mentioned network.

(20) The aspect realized by combining the constituent elements described in the above-described embodiments and the modifications in any way is encompassed within the scope of the present disclosure.

The present disclosure is available in order to efficiently and appropriately detect that a fraudulent ECU has sent a fraudulent message to the bus in an in-vehicle network system.

What is claimed is:

1. A fraud detection method for use in an in-vehicle network system, the fraud detection method comprising:
   receiving at least one data frame sent to an in-vehicle network;
   verifying a specific identifier in the received data frame only when the received data frame is event-driven data and a state of a vehicle having the in-vehicle network system mounted therein is a predetermined state;
   detecting the received data frame as an authenticated data frame when the verifying is successful; and
   detecting the received data frame as a fraudulent data frame when the verifying fails,
   wherein the predetermined state of the vehicle is the vehicle traveling.

2. The fraud detection method according to claim 1, wherein the specific identifier is disposed in a data field of the received data frame at a predetermined position, and
   wherein the verifying verifies whether the specific identifier is a message authentication code that reflects information in the received data frame.

3. The fraud detection method according to claim 1, wherein the specific identifier is disposed in a data field of the received data frame at a predetermined position, and
   wherein the verifying verifies whether the specific identifier is same as a predetermined value.

4. The fraud detection method according to claim 1, wherein the specific identifier is disposed in a data field of the received data frame at a predetermined position, and
   wherein the verifying verifies whether the specific identifier is same as a counter value that reflects a number of times at which data frames that are the event-driven data are received.

5. The fraud detection method according to claim 1, wherein the at least one data frame sent to the in-vehicle network comprises a plurality of data frames,
   wherein in the receiving, the plurality of data frames is sequentially received,
   wherein the specific identifier is disposed in a data field of the received plurality of data frames at a predetermined position, and
   wherein the verifying verifies whether the specific identifier is same as a value obtained through a predetermined calculation based on a specific identifier in a data frame previously received in the receiving of the plurality of data frames.

6. The fraud detection method according to claim 1, wherein the verifying determines whether the received data frame is not the event-driven data,
   wherein when the received data frame is the event-driven data, whether the state of the vehicle is the predetermined state is determined, and
   wherein when the state of the vehicle is the predetermined state, the verifying is performed on the specific identifier.

7. The fraud detection method according to claim 1, wherein when the received data frame is the event-driven data, the received data frame is detected as being an authorized data frame.

8. The fraud detection method according to claim 1, wherein in the verifying, when the received data frame is the event-driven data and the state of the vehicle having the in-vehicle network system mounted therein is not the predetermined state, the received data frame is detected as being an authorized data frame.

9. The fraud detection method according to claim 1, wherein in the verifying, when the received data frame is the event-driven data and the state of the vehicle having the in-vehicle network system mounted therein is not the predetermined state, the received data frame is detected as being the fraudulent data frame.

10. A method for use in an in-vehicle network system, the method comprising:
   providing a specific identifier in a data frame, that is to be sent, only when a state of a vehicle having the in-vehicle network system mounted therein is a predetermined state and the data frame is event-driven data; and
   sending, to an in-vehicle network, the data frame that includes the provided specific identifier and that is the event-driven data,
   wherein the predetermined state of the vehicle is the vehicle traveling.

11. The method according to claim 10, wherein in the providing, a message authentication code that reflects information in the data frame to be sent is disposed in a data field of the data frame at a predetermined position as the specific identifier.

12. The method according to claim 10, wherein in the providing, a predetermined value is disposed in a data field of the data frame as the specific identifier.

13. The method according to claim 10, wherein in the providing, a counter value that reflects a number of transmissions of data frames that are the event-driven data in the sending is disposed in a data field of the data frame at a predetermined position as the specific identifier.

14. The method according to claim 10, wherein the data frame sent to the in-vehicle network comprises a plurality of data frames, and
   wherein in the providing, a resultant value obtained by performing a predetermined calculation on a basis of a specific identifier provided in a data frame previously sent in the sending is disposed in a data field of each of the plurality of data frames.

15. An in-vehicle network system, comprising:
   a first electronic controller including one or more memories and circuitry that, in operation, provides a specific identifier in at least one data frame, that is to be sent, only when a state of a vehicle having the in-vehicle network system mounted therein is a predetermined state and the data frame is event-driven data regarding a transmission period, and sends, to an in-vehicle network, the data frame that includes the provided specific identifier and that is the event-driven data; and
   a second electronic controller including one or more memories and circuitry that, in operation, receives the data frame sent to the in-vehicle network and verifies the specific identifier in the received data frame only when the received data frame is the event-driven data and the state of the vehicle having the in-vehicle network system mounted therein is the predetermined state,
   wherein when verification is successful, the second electronic controller detects the received data frame as being an authorized data frame,
   wherein when the verification fails, the second electronic controller detects the received data frame as being a fraudulent data frame, and
   wherein the predetermined state of the vehicle is the vehicle traveling.

16. An electronic controller, comprising:
   one or more memories; and
   circuitry that, in operation:
      provides a specific identifier in at least one data frame, that is to be sent, only when a state of a vehicle having an in-vehicle network system mounted therein is a predetermined state and the data frame is event-driven data; and
      sends, to an in-vehicle network, the data frame that includes the provided specific identifier and that is the event-driven data,
   wherein the predetermined state of the vehicle is the vehicle traveling.

17. An electronic controller, comprising:
   one or more memories; and
   circuitry that, in operation:
      receives at least one data frame sent to an in-vehicle network; and
      verifies a specific identifier in the received data frame only when the received data frame is event-driven data and a state of a vehicle having an in-vehicle network system mounted therein is a predetermined state,
   wherein when verification is successful, the electronic controller detects the received data frame as being an authorized data frame,
   wherein when the verification fails, the electronic controller detects the received data frame as being a fraudulent data frame, and wherein the predetermined state of the vehicle is the vehicle traveling.

* * * * *